US007085885B2

United States Patent
Hardage, Jr.

(10) Patent No.: US 7,085,885 B2
(45) Date of Patent: Aug. 1, 2006

(54) APPARATUS AND METHOD FOR EARLY CACHE MISS DETECTION

(76) Inventor: James N. Hardage, Jr., 2313 Rimrock Dr. South, Austin, TX (US) 78738

( * ) Notice: Subject to any disclaimer, the term of this patent is extended or adjusted under 35 U.S.C. 154(b) by 459 days.

(21) Appl. No.: 10/266,019

(22) Filed: Oct. 7, 2002

(65) Prior Publication Data

US 2004/0068617 A1    Apr. 8, 2004

Related U.S. Application Data

(60) Provisional application No. 60/375,468, filed on Apr. 24, 2002.

(51) Int. Cl.
*G06F 12/00* (2006.01)

(52) U.S. Cl. .................... 711/119; 711/3; 711/113; 711/118; 711/122; 711/140; 711/146

(58) Field of Classification Search .............. 711/3, 711/113, 118, 119, 122, 140, 146; 709/247
See application file for complete search history.

(56) References Cited

U.S. PATENT DOCUMENTS

| 5,598,550 | A | * | 1/1997 | Shen et al. ................. 711/146 |
| 5,784,590 | A |   | 7/1998 | Cohen et al. ............... 711/122 |
| 6,076,147 | A |   | 6/2000 | Lynch et al. ............... 711/146 |
| 6,272,601 | B1 | * | 8/2001 | Nunez et al. ............... 711/140 |
| 6,473,837 | B1 |   | 10/2002 | Hughes et al. ............. 711/146 |

* cited by examiner

*Primary Examiner*—Mano Padmanabhan
*Assistant Examiner*—Mardochee Chery

(57) ABSTRACT

A cache memory that notifies other functional blocks in the microprocessor that a miss has occurred potentially N clocks sooner than the conventional method, where N is the number of stages in the cache pipeline. The multiple pass cache receives a plurality of busy indicators from resources needed to complete various transaction types. The cache distinguishes between a first set of resources needed to complete a transaction when its cache line address hits in the cache and a second set of resources needed to complete the transaction type when the address misses in the cache. If none of the second set of resources for the type of the transaction type is busy on a miss, then the cache immediately signals a miss rather than retrying the transaction by sending it back through the cache pipeline and causing N additional clock cycles to occur before signaling the miss.

35 Claims, 15 Drawing Sheets

Cache Memory

Cache Memory

Conventional Cache Action Logic

Conventional Cache Action Logic

Conventional Cache Action Logic

Conventional Cache Operation

*Hit/Miss Resource-Differentiating Cache Action Logic*

Hit/Miss Resource-Differentiating Cache Action Logic

*Hit/Miss Resource-Differentiating Cache Operation*

**Hit/Miss Resource-Differentiating Cache Action Logic
(Alternate Embodiment)**

**_Hit/Miss Resource-Differentiating Cache Action Logic_
_(Alternate Embodiment)_**

**Hit/Miss Resource-Differentiating Cache Operation
(Alternate Embodiment)**

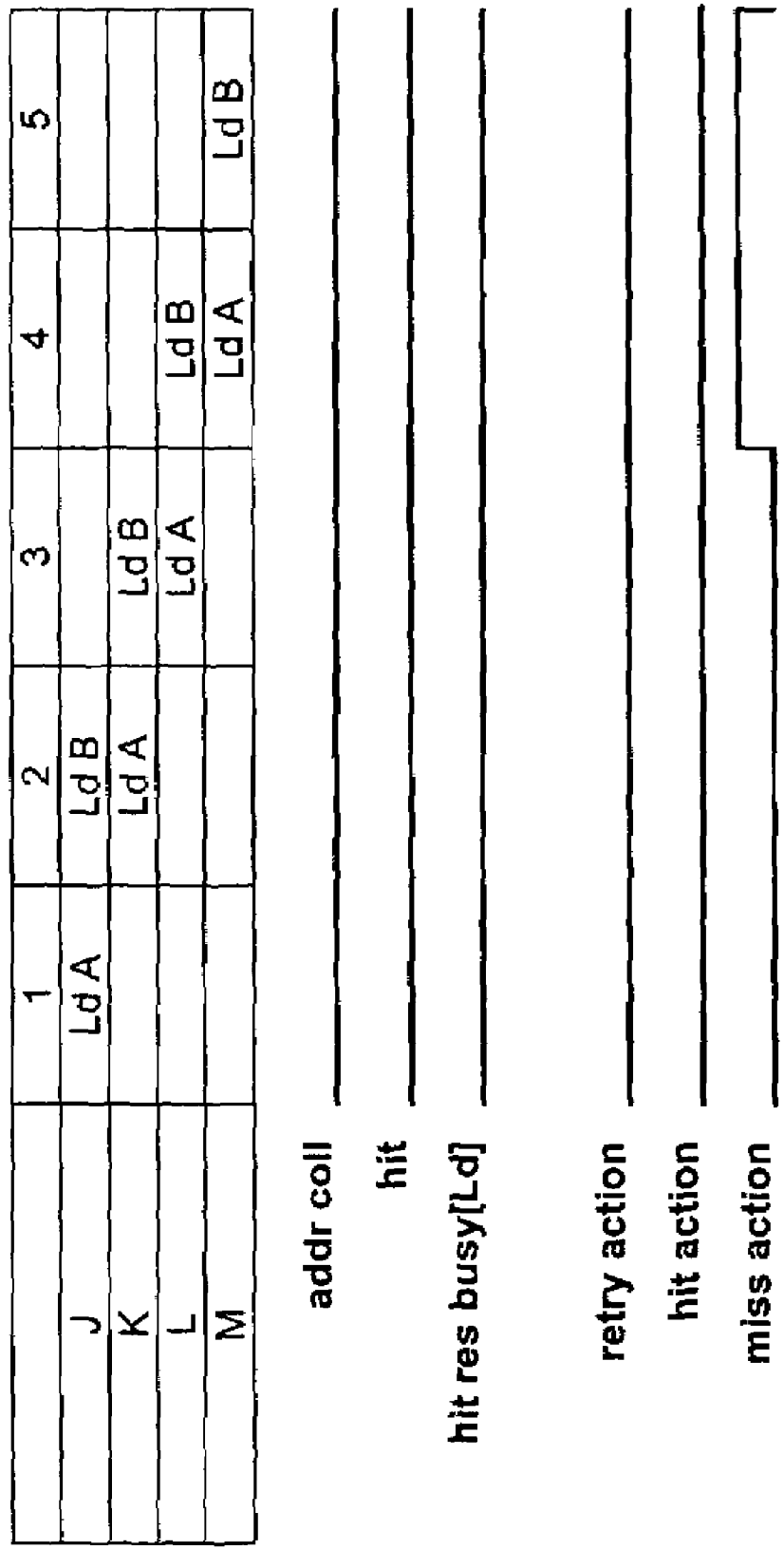

APPARATUS AND METHOD FOR EARLY CACHE MISS DETECTION

This application claims priority based on U.S. Provisional Application Ser. No. 60/375,468, filed Apr. 24, 2002, entitled APPARATUS AND METHOD FOR EARLY MISS DETECTION IN L2 CACHE.

FIELD OF THE INVENTION

This invention relates in general to the field of data caches in microprocessors, and particularly to early detection and signaling of cache misses.

BACKGROUND OF THE INVENTION

A modern computer system includes a microprocessor. The microprocessor reads and writes data from and to a memory in the system that is external to the microprocessor. Transfers of data between the microprocessor and memory are relatively slow compared to the speed at which the microprocessor can perform operations internally on the data. Consequently, the microprocessor may spend time idle waiting for data from the memory or waiting for data to be written to the memory, resulting in reduced performance.

To address this problem, modern microprocessors include one or more cache memories. A cache memory, or cache, is a memory internal to the microprocessor—typically much smaller than the system memory—that stores a subset of the data in the system memory. The cache stores data in cache lines. A cache line is the smallest unit of data than can be transferred between the cache and the system memory. A common cache line size is 32 bytes. When the microprocessor executes an instruction that references data, the microprocessor first checks to see if the cache line containing the data is present in the cache and is valid. If so, the instruction can be executed immediately since the data is already present in the cache. That is, in the case of a read, or load, the microprocessor does not have to wait while the data is fetched from the memory into the microprocessor. Similarly, in the case of a write, or store, the microprocessor can write the data to the cache and proceed on instead of having to wait until the data is written to memory.

The condition where the microprocessor detects that the cache line containing the data is present in the cache and valid is commonly referred to as a cache hit, or hit. The condition where the microprocessor detects that the cache line is not present or is invalid is commonly referred to as a cache miss, or miss.

When a cache miss occurs, the cache must notify other functional blocks within the microprocessor that the miss has occurred so that the missing cache line can be fetched into the cache. In a conventional cache, the cache does not immediately notify the other functional block that the miss has occurred in some cases. Instead, in some cases the cache retries the transaction that caused the miss. In a retry, the cache causes the transaction to re-arbitrate with other transactions for access to the cache and re-sequence through the cache pipeline.

Most caches have a high hit rate. It is not uncommon for caches to have greater than 90% hit rate, depending upon the data set involved. Consequently, if the cache delays in notifying the other functional blocks that a miss has occurred, the affect on performance is typically not great.

However, certain cache configurations can typically have much lower hit rates. For example, some microprocessors employ a hierarchical cache scheme of multiple caches, commonly referred to as a level-one (L1) cache and a level-two (L2) cache. The L1 cache is closer to the computation elements of the microprocessor than the L2 cache, and is capable of providing data to the computation elements faster than the L2 cache. Some L2 caches function as victim caches. With a victim cache configuration, when a cache line is discarded, or cast out, from the L1 cache, the cache line is written to the L2 cache rather than writing the cache line to system memory. The hit rate of some L2 victim caches, particularly where the size of the L2 cache is the same or smaller than the size of the L1 cache, has been observed to be approximately 50%.

As the hit rate of a cache decreases, the impact of the cache delaying to notify the other functional blocks that a miss has occurred may negatively impact performance. Therefore, what is needed is a cache that reduces the delay in notifying the other functional blocks that a miss has occurred.

SUMMARY

The present invention provides a cache memory that distinguishes between different sets of resources needed to complete a transaction based on whether the transaction hits or misses in the cache. The cache generates a miss action signal based on whether the miss set of resources is busy only and does not retry the transaction if a resource in the hit set of resources is busy as long as none of the miss set of resources is busy. The hit and miss sets of resources may vary from one transaction type to another. Accordingly, in attainment of the aforementioned object, it is a feature of the present invention to provide a cache memory. The cache memory includes a first set of resources needed to complete a transaction if a cache line address of the transaction hits in the cache. The cache memory also includes a second set of resources needed to complete the transaction if the address misses in the cache. The second set of resources is different than the first set of resources. The cache memory also includes control logic coupled to the first and second set of resources. If the address misses in the cache, and if none of the second set of resources is busy, then the control logic asserts a miss indicator rather than retrying the transaction, regardless of whether any of the first set of resources is busy.

In another aspect, it is a feature of the present invention to provide a cache memory. The cache memory includes a plurality of type signals that specify which of a plurality of transaction types a transaction is. The transaction specifies a cache line. The cache memory also includes a hit signal that indicates whether the cache line is present in the cache. The cache memory also includes a plurality of busy signals that specify whether a corresponding plurality of resources is busy. A predetermined subset of the plurality of resources is needed for completing the transaction. The predetermined subset is based on the hit signal and the plurality of transaction type signals. The cache memory also includes control logic, coupled to receive the plurality of type signals, the hit signal, and the plurality of busy signals. The control logic generates a miss action signal based on the plurality of busy signals only in the predetermined subset.

In another aspect, it is a feature of the present invention to provide a method for generating cache action signals of a cache memory. The method includes determining whether a cache line address is present in the cache memory, determining whether any of a first set of resources is busy if the cache line address is present in the cache memory, and determining whether any of a second set of resources is busy if the cache line address is not present in the cache memory.

The method also includes generating a miss action signal if none of the second set of resources is busy if the cache line address is not present in the cache memory even if some of the first set of resources is busy.

An advantage of the present invention is that it potentially reduces the amount of time to notify the other functional blocks in the microprocessor that a miss has occurred by N clock cycles, where N is the depth of the cache pipeline. Another advantage is that fewer retries of transactions to the cache must be performed. Because each retried transaction requires arbitration for the cache and at least N clock cycles to complete, traffic in the cache is reduced.

Other features and advantages of the present invention will become apparent upon study of the remaining portions of the specification and drawings.

BRIEF DESCRIPTION OF THE DRAWINGS

FIG. 2, comprising

FIG. 6, comprising

FIG. 9, comprising

FIG. 11 is a timing diagram illustrating exemplary operation of the cache of FIG. 1 having the control logic of FIG. 9 according to the flowchart of FIG. 10 according to an alternate embodiment of the present invention.

DETAILED DESCRIPTION

Figure 1:
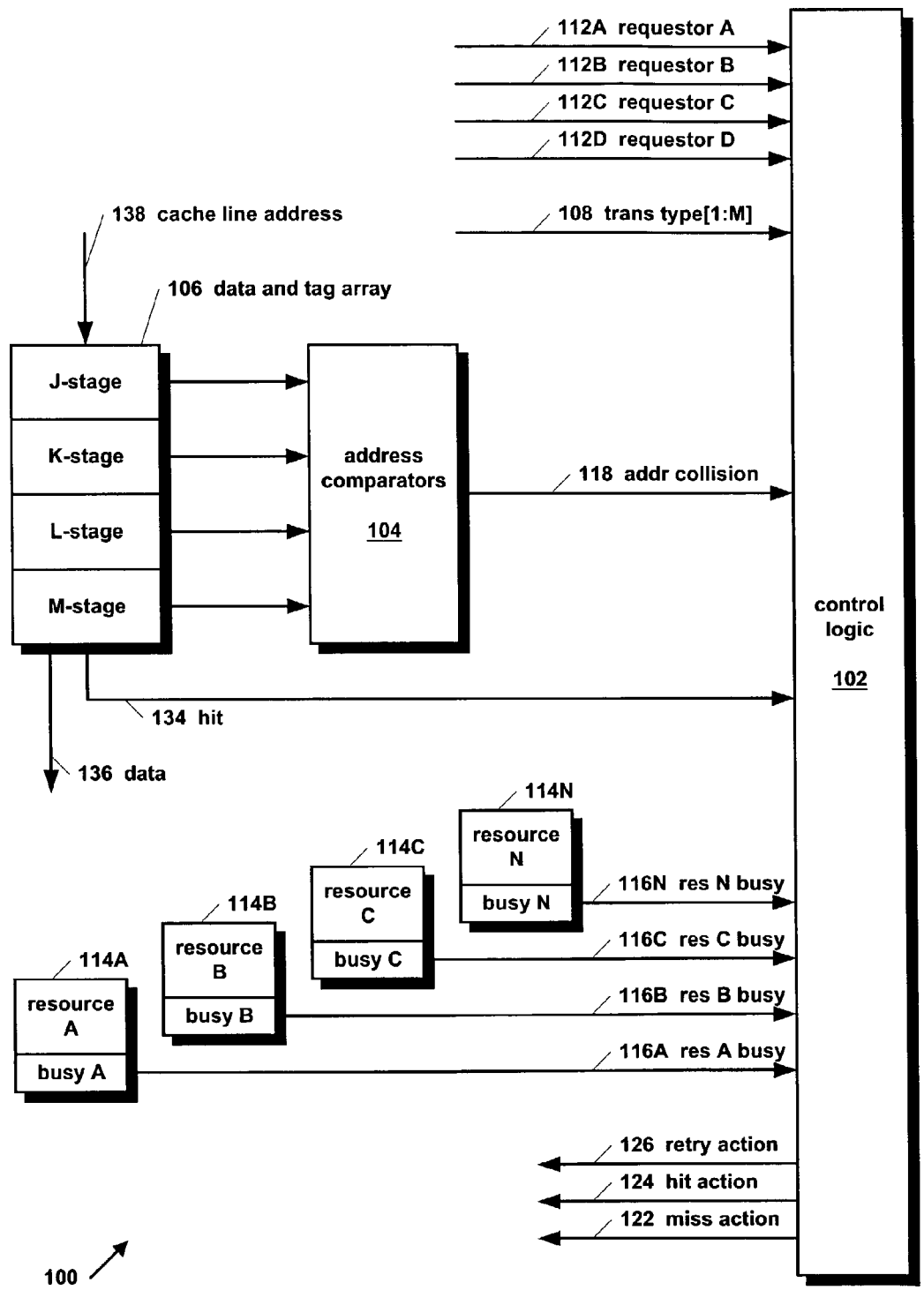
FIG. 1 is a block diagram illustrating a cache memory according to the present invention.

Referring now to FIG. 1, a block diagram illustrating a cache memory 100 according to the present invention is shown. In one embodiment, cache 100 is an L2 victim cache.

The cache 100 includes control logic 102. The control logic 102 receives a plurality of requester signals 112. In FIG. 1, four representative requester signals are shown, denoted requester A 112A, requester B 112B, requester C 112C, and requester D 112D. The requester signals 112 request control logic 102 to arbitrate between the requesters generating requester signals 112 for access to the cache 100, particularly to a data and tag array 106, described below, to perform transactions. The transactions may be of various types, such as load transactions, store transactions, snoop transactions, and castout transactions. The control logic 102 also receives a plurality of transaction type signals 108[1:M] corresponding to the various transaction types, where M is the number of different transaction types. One of the transaction type signals 108 is asserted true to indicate the type of transaction to be performed by the requester 112 that wins arbitration for the cache 100.

The cache 100 also includes a data and tag array 106, coupled to control logic 102. The data array 106 stores the cache lines cached therein. The tag array 106 stores the addresses associated with the cache lines stored in the data array 106. The tag array 106 also stores the cache status of each line in the data array 106. In the embodiment of FIG. 1, the data and tag array 106 comprises a 4-stage pipeline. The stages are successively denoted J, K, L, and M. The data and tag array 106 receives a cache line address 138 of the transaction accessing the cache 100. The cache line address 138 is piped down through registers in the J, K, L, and M pipeline stages. In response, the tag array 106 generates a hit signal 134, which is provided to control logic 102, which is true if the cache line address 138 is present in the tag array 106 and the associated cache line in the data array 106 is valid. Furthermore, the data array 106 outputs the cache line data 136 selected by the cache line address 138.

The cache 100 also includes a plurality of address comparators 104, coupled to the data and tag array 106. The address comparators 104 receive the addresses from the address registers in the pipeline stages and compare the cache line addresses associated with the various transactions in the cache 100 pipeline and generate address collision signals 118 to indicate matches between various of the pipeline addresses. The address collision signals 118 are used to enforce the order of certain transactions in the pipeline in order to insure data coherency. The address collision signals 118 are provided to control logic 102.

The cache 100 also includes a plurality of resources 114, coupled to control logic 102. The resources 114 are representatively denoted resource A 114A, resource B 114B, resource C 114C, and resource N 114N. The resources 114 comprise various registers, buffers, or other resources needed to perform a transaction. The control logic 102 receives a plurality of resource busy signals 116 that indicate whether the corresponding one of resources 114 is currently busy being used by another transaction. The resource busy signals 116 are denoted resource A busy 116A, resource B busy 116B, resource C busy 116C, and resource N busy 116N.

The cache 100 generates a retry action signal 126, a hit action signal 124, and a miss action signal 122, in response to transaction type signals 108, address collision signals 118, hit signal 134, and resource busy signals 116. The retry action signal 126 indicates that the transaction at the bottom of the cache 100 pipeline must be retried. That is, the transaction must re-request access to the data and tag array 106, win arbitration, and be re-sequenced through the cache 100 pipeline again. Reasons the transaction cannot complete are because of an address collision or because one of the resources 114 needed by the transaction to complete is busy, as will be described below. Each type of transaction requires a different set of resources 114. If one of the set of resources 114 needed by the transaction at the bottom of the cache 100 pipeline is busy, control logic 102 generates a true value on retry action signal 126. Advantageously, the present invention differentiates between the set of resources 114 needed by a particular transaction type when the cache line address 138 misses in the data and tag array 106 and the set of resources 114 needed by the transaction type when the cache line address 138 hits in the data and tag array 106, as will be described below in more detail.

The hit action signal 124 indicates that the transaction can be completed as a hit since the cache line address 138 hit in the data and tag array 106 and the required resources 114 are available and no relevant address collisions occurred. In one embodiment, cache 100 is a multi-pass cache. That is, most transaction types require two or more passes through the cache 100 pipeline to complete. For example, on a transaction type that stores into the cache 100, on the first pass the tag array 106 is read to obtain the status of the cache line specified by cache line address 138. Then on the second and any necessary subsequent passes, the data and tag array 106 are updated with the new cache line and associated address and status. If the cache 100 is being read, a true value on the hit action signal 124 indicates the data 136 provided by the data and tag array 106 is valid. In one embodiment, the hit action signal 124 indicates the results of the first non-retried pass of a transaction through the pipeline.

The miss action signal 122 indicates that the transaction can be completed as a miss since the cache line address 138 missed in the data and tag array 106 and the required resources 114 are available and no relevant address collisions occurred. In particular, a true value on the miss action signal 122 indicates to the other functional blocks in the microprocessor that a miss occurred, and therefore the data associated with the cache line address 138 must be obtained elsewhere, such as from system memory. Advantageously, the present invention notifies the other functional blocks via the miss action signal 122 sooner in the aggregate than a conventional cache. In particular, in the case of a missing transaction that must be retried in the conventional cache due to a busy resource, the present invention in some cases signifies a miss N clock cycles sooner, where N is the cache 100 pipeline depth, as will be described below.

Before describing the present invention further, it will be useful to describe a conventional cache in order to more fully illustrate the advantages of the present invention in comparison. The conventional cache will be described with reference to cache 100 of FIG. 1; however, the control logic 102 of FIG. 1 is different for the cache 100 of the present invention than for the conventional cache, as described below.

Figure 2A:
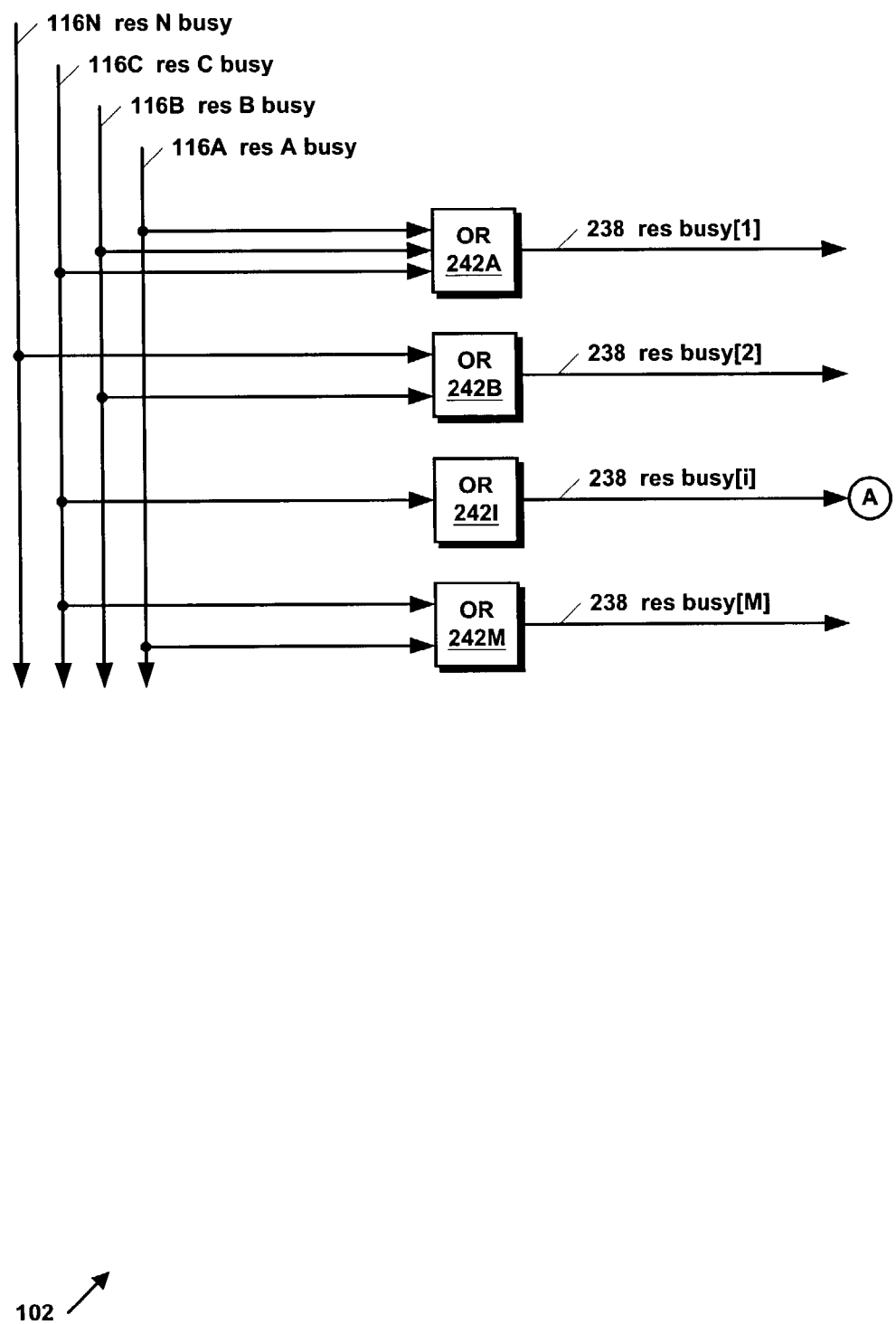
FIGS. 2A, 2B, and 2C, is a related art block diagram illustrating conventional logic comprised in the control logic of FIG. 1 to generate the retry action signal, hit action signal, and miss action signal of FIG. 1.
Figure 2B:
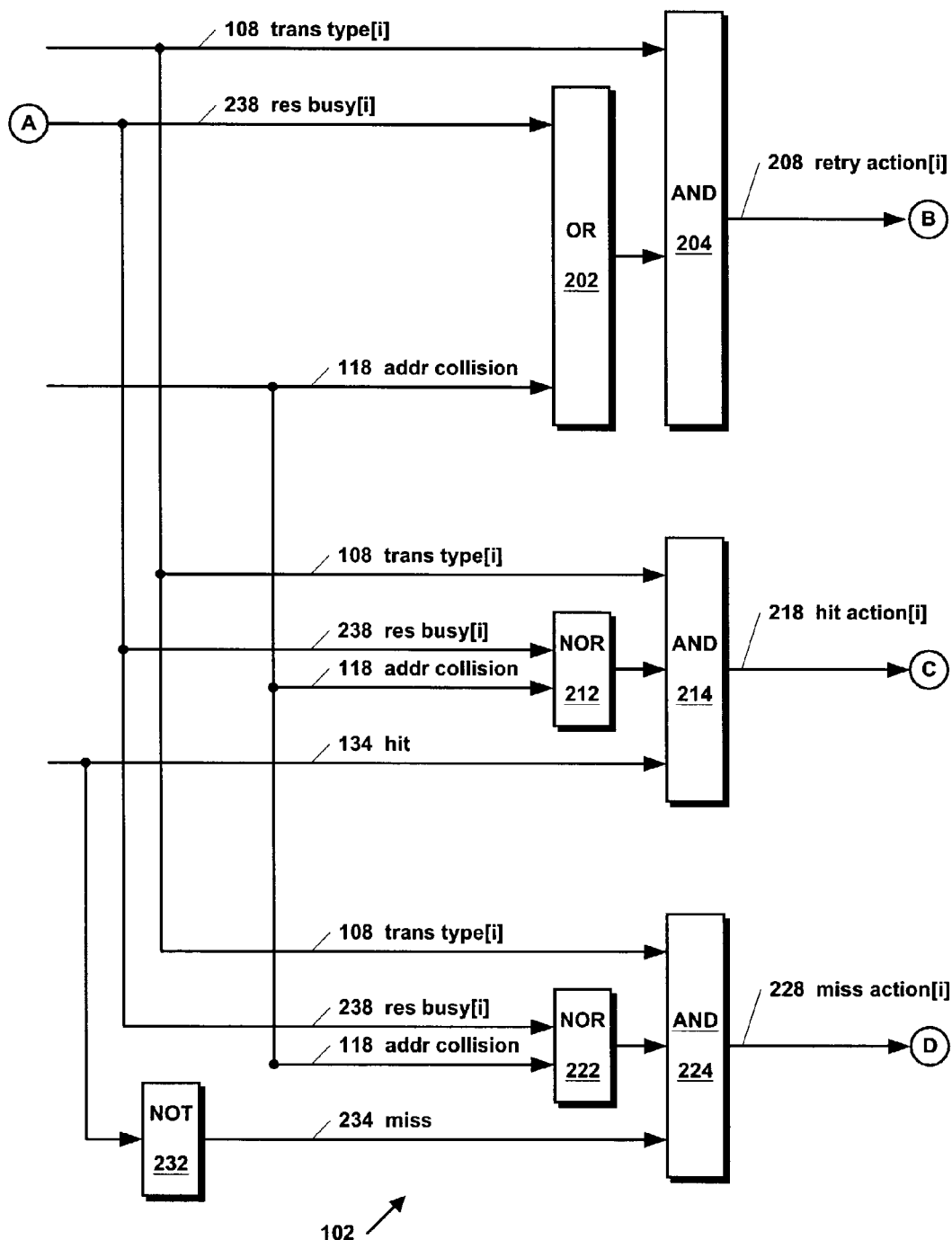
Figure 2C:
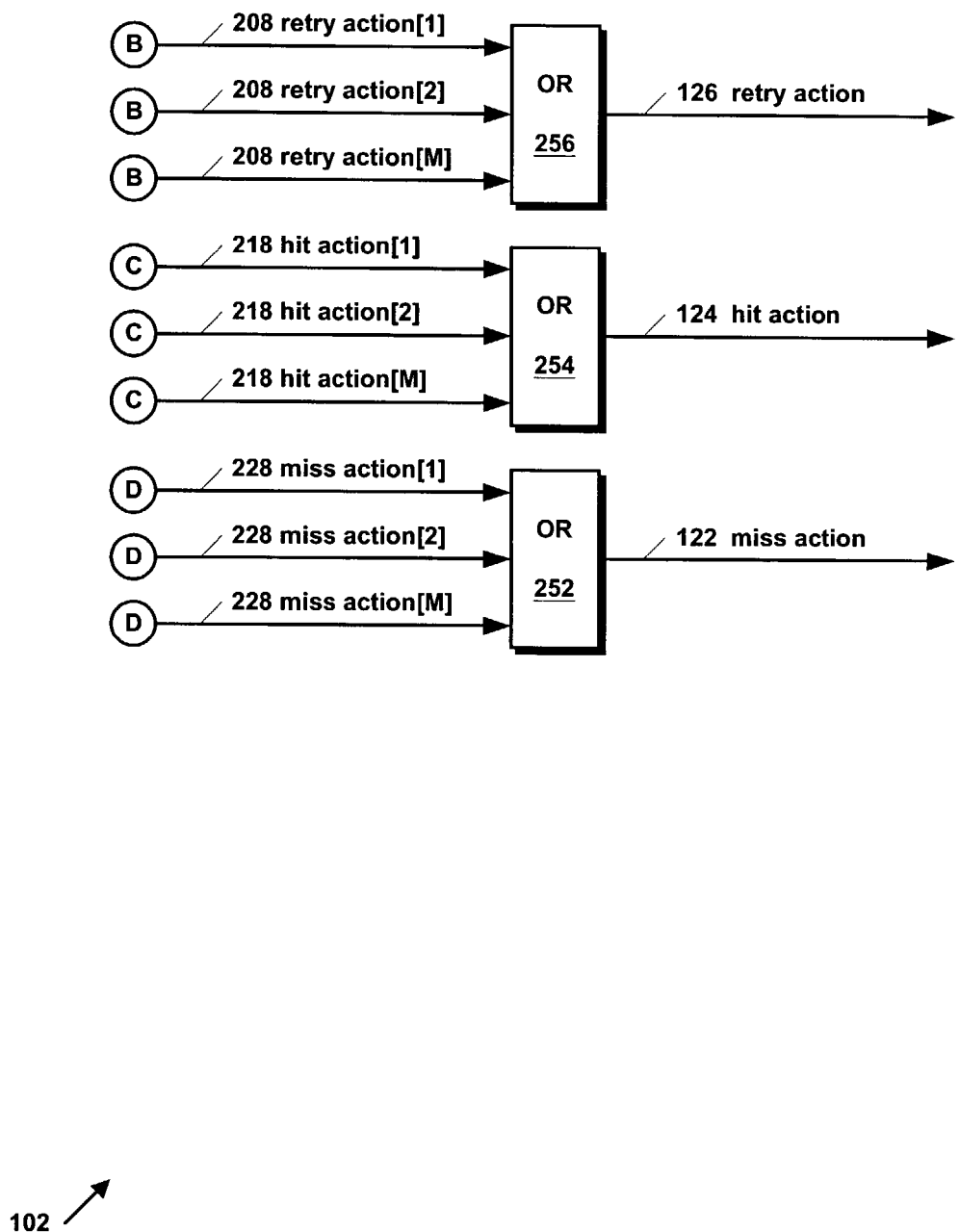

Referring now to FIGS. 2A, 2B, and 2C referred to collectively as FIG. 2, a related art block diagram illustrating conventional logic comprised in control logic 102 of FIG. 1 to generate retry action signal 126, hit action signal 124, and miss action signal 122 of FIG. 1 is shown.

Referring now to FIG. 2A, control logic 102 includes M OR gates 242 corresponding to the M transaction types. The OR gates 242 generate transaction type-specific resource busy signals 238[1:M]. The OR gates 242 receive various ones of the resource busy signals 116 of FIG. 1 and each generate a corresponding one of the transaction type-specific resource busy signals 238[1:M]. A resource busy signal 238[i] is true if any of the resource busy signals 116 going into its corresponding OR gate 242 is true. The set of resource busy signals 116 going into the various OR gates 242 of FIG. 2A is different, as shown, to illustrate that the set of resources 114 of FIG. 1 for each transaction type may be different. That is, the number and set of resource busy signals 116 may or may not be different for each transaction type.

Referring now to FIG. 2B, control logic 102 includes a collection of combinatorial logic including an OR gate 202, three AND gates 204, 214, and 224, two NOR gates 212 and 222, and an inverter 232. One set of the combinatorial logic shown in FIG. 2B is included in control logic 102 for each of the M transaction types, and FIG. 2B shows the combinatorial logic associated with one representative transaction type. The inverter 232 receives hit signal 134 of FIG. 1 and generates a miss signal 234.

OR gate 202 receives transaction type-specific resource busy signal 238[i] of FIG. 2A and address collision signal 118 of FIG. 1. The output of OR gate 202 is provided to AND gate 204. AND gate 204 also receives transaction type signal 108[i] of FIG. 1 and generates a transaction type-specific retry action[i] signal 208.

NOR gate 212 receives transaction type-specific resource busy signal 238[i] and address collision signal 118. The output of NOR gate 212 is provided to AND gate 214. AND gate 214 also receives transaction type signal 108[i] and hit signal 134 and generates a transaction type-specific hit action[i] signal 218.

NOR gate 222 receives transaction type-specific resource busy signal 238[i] and address collision signal 118. The output of NOR gate 222 is provided to AND gate 224. AND gate 224 also receives transaction type signal 108[i] and miss signal 234 and generates a transaction type-specific miss action[i] signal 228.

Referring now to FIG. 2C, control logic 102 includes three OR gates 252, 254, and 256. OR gate 256 receives all of the transaction type-specific retry action signals 208 of FIG. 2B and generates retry action signal 126 of FIG. 1. OR gate 254 receives all of the transaction type-specific hit action signals 218 of FIG. 2B and generates hit action signal 124 of FIG. 1. OR gate 252 receives all of the transaction type-specific miss action signals 228 of FIG. 2B and generates miss action signal 122 of FIG. 1. In one embodiment, control logic 102 also includes registers that store the value of miss action signal 122, hit action signal 124, and retry action signal 126 output by OR gates 252, 254, and 256, respectively, based on a clock signal.

Figure 3:
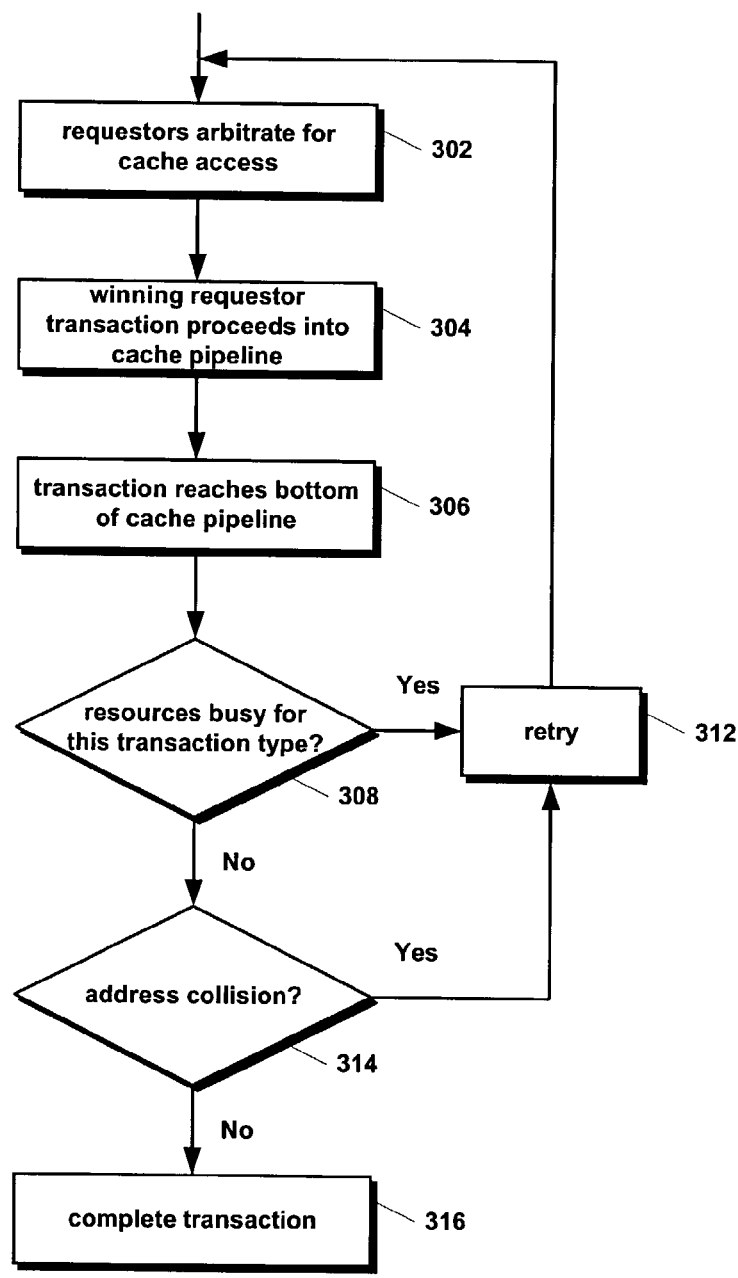
FIG. 3 is a related art flow chart illustrating operation of the cache of FIG. 1 having the conventional control logic of FIG. 2.

Referring now to FIG. 3, a related art flow chart illustrating operation of the cache 100 of FIG. 1 having the conventional control logic 102 of FIG. 2 is shown. Flow begins at block 302.

At block 302, control logic 102 arbitrates between the requesters 112 of FIG. 1 for access to data and tag array 106. Flow proceeds to block 304.

At block 304, the transaction associated with the requester 112 winning arbitration proceeds into and sequences through the cache 100 pipeline. Flow proceeds to block 306.

At block 306, the transaction reaches the bottom of the cache 100 pipeline. Flow proceeds to decision block 308.

At decision block 308, control logic 102 examines the resource busy signals 116 of FIG. 1 to determine whether any of the resources 114 needed to perform the type of transaction specified by the true transaction type signals 108 are busy. If so, flow proceeds to block 312. Otherwise, flow proceeds to decision block 314.

At block 312, control logic 102 generates a true value on retry action signal 126 of FIG. 1 to indicate that the transaction must be retried because one or more of the resources 114 possibly needed to complete the transaction are busy, as determined at block 308. Flow proceeds back to block 302 so that the transaction can re-arbitrate for access to data and tag array 106.

At decision block 314, control logic 102 examines address collision signals 118 to determine whether an address collision has occurred that would prevent the transaction from completing. If so, flow proceeds to block 312 so that the transaction is retried. Otherwise, flow proceeds to block 316.

At block 316, the cache 100 completes the transaction. That is, the transaction exits the cache 100 or the cache 100 performs one or more additional passes of the transaction through the cache 100 pipeline. Flow ends at block 316.

Figure 4:
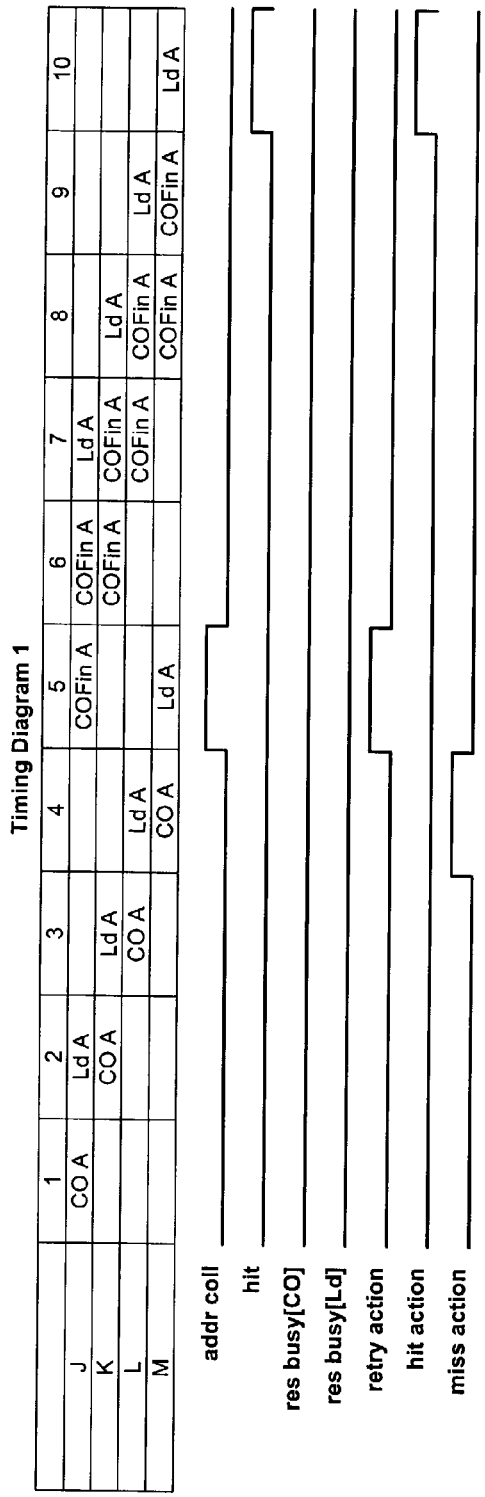
FIGS. 4 and 5 are four related art timing diagrams illustrating exemplary operation of the cache of FIG. 1 having the conventional control logic of FIG. 2 according to the flowchart of FIG. 3.
Figure 4:
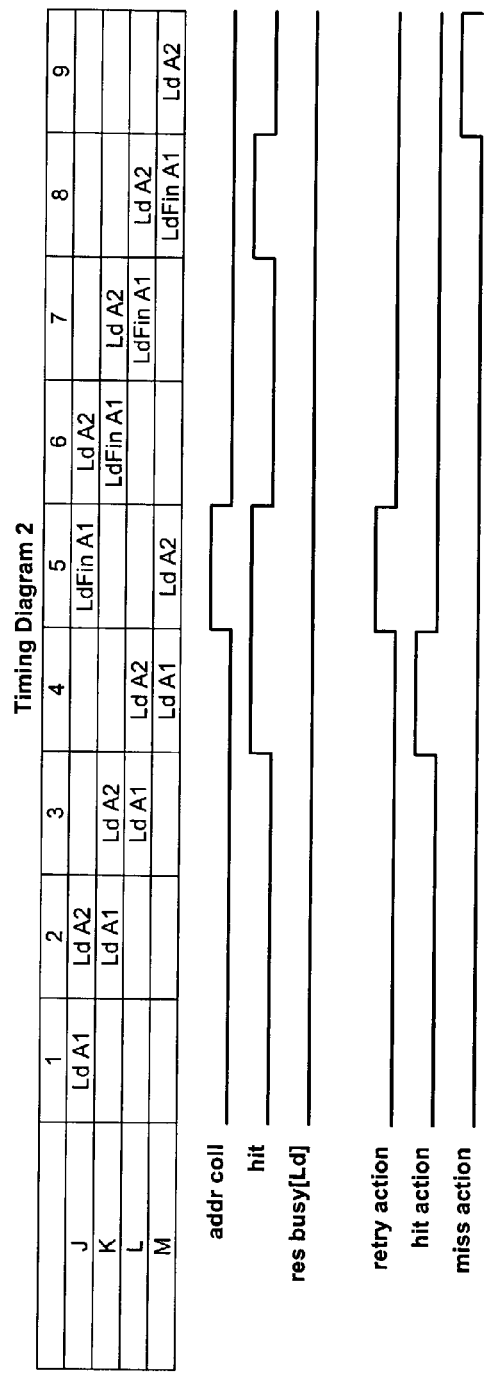

Referring now to FIG. 4, two related art timing diagrams illustrating exemplary operation of the cache 100 of FIG. 1 having the conventional control logic 102 of FIG. 2 according to the flowchart of FIG. 3 are shown. Timing diagram 1 comprises ten columns corresponding to ten successive clock cycles and four rows corresponding to the four cache 100 pipeline stages J, K, L, M of FIG. 1. Each entry in the diagram shows the contents of the corresponding pipeline stage during the specified clock cycle.

Timing diagram 1 is an example in which two transactions generate an address collision that consequently causes the second transaction to be retried due to the address collision. The first transaction, a castout transaction to an address denoted A, denoted "CO A," to cache 100 from another cache, such as an L1 instruction cache. The second transaction is a load transaction from the same address A, denoted "Ld A," into another cache, such as an L1 data cache.

CO A enters the pipeline at stage J during clock cycle 1 and proceeds down the pipeline until it reaches the bottom stage M during clock cycle 4, as shown. Therefore, during clock cycle 4, the transaction type signal 108 of FIG. 1 corresponding to the castout transaction type is true and the other transaction type signals 108 are false. In the example, during clock 4, CO A misses in the data and tag array 106 of FIG. 1; hence hit signal 134 is false, as shown, causing miss signal 234 of FIG. 2B to be true. Additionally in the example, none of the resources needed to perform the castout type transaction are busy during clock 4; hence the castout type transaction OR gate 242 of FIG. 2A generates a false value on castout transaction type-specific resource busy signal 238[CO], as shown. Consequently, OR gate 252 of FIG. 2C generates a true value on miss action signal 122, as shown.

During clocks 5 through 9, two successive castout finish transactions, or sub-transactions, denoted "COFin A," sequence through the pipeline to store the cache line that was castout of the L1 instruction cache into cache 100. That is, the COFin A sub-transactions are the additional passes through the cache 100 needed to store the castout cache line into the cache 100. In one embodiment of cache 100, the data path into the data and tag array 106 is 16 bytes wide and a cache line is 32 bytes wide. Therefore, two COFin A transactions are required to store a 32 byte cache line.

During clock 2, Ld A enters the pipeline and proceeds down the pipeline until it reaches the bottom during clock cycle 5, as shown. Therefore, during clock 5, the transaction type signal 108 of FIG. 1 corresponding to the Ld transaction type is true and the other transaction type signals 108 are false. During clock 5, address comparators 104 of FIG. 1 generate a true value on address collision signal 118, as shown, because the cache line data associated with the castout to address A must be stored into the cache 100 before Ld A can complete or else Ld A would receive the wrong cache line data. Consequently, OR gate 202 of FIG. 2B generates a true value which causes AND gate 204 of FIG. 2B to generate a true value on retry action [Ld] 208, which in turn causes OR gate 256 of FIG. 2C to generate a true value on retry action signal 126 of FIG. 1, as shown.

Ld A is retried and wins arbitration at clock 7. That is, Ld A re-arbitrates for the data and tag array 106 and proceeds through the pipeline and arrives at the bottom of the pipeline at clock 10, as shown. Therefore, during clock 10, the transaction type signal 108 of FIG. 1 corresponding to the Ld transaction type is true and the other transaction type signals 108 are false. Because the cache line of address A is now cached in the cache 100 by the castout transaction, data and tag array 106 generates a true value on hit signal 134 during clock 10, as shown. In the example, no load transaction type resources 114 are busy. Therefore, the load type transaction OR gate 242 of FIG. 2A generates a false value on load transaction type-specific resource busy signal 238 [Ld], as shown. Consequently, NOR gate 212 of FIG. 2B generates a true value on its output, and AND gate 214 of FIG. 2B generates a true value on hit action [Ld] 218 of FIG. 2B, which further causes OR gate 254 of FIG. 2C to generate a true value on hit action signal 124 of FIG. 1, as shown.

Referring now to Timing Diagram 2 of FIG. 4, another example in which two transactions generate an address collision that consequently causes the second transaction to be retried due to the address collision is shown. However, converse to the example of Timing Diagram 1, the first transaction generates a hit action and the second transaction generates a miss action in the example of Timing Diagram 2. The first transaction, a load transaction, denoted "Ld A1," from cache 100 into another cache, such as an L1 data cache, to address A. The second transaction is a load transaction, denoted "Ld A2," from cache 100 into another cache, such as an L1 instruction cache, to the same address A.

Ld A1 enters the pipeline at stage J during clock cycle 1 and proceeds down the pipeline until it reaches the bottom of the pipeline during clock cycle 4, as shown. Therefore, during clock cycle 4, the transaction type signal 108 corresponding to the load transaction type is true and the other transaction type signals 108 are false. In the example, during clock 4, Ld A1 hits in the data and tag array 106; hence hit signal 134 is true, as shown, causing miss signal 234 to be false. Additionally in the example, none of the resources needed to perform the load type transaction are busy during clock 4; hence the load type transaction OR gate 242 of FIG. 2A generates a false value on load transaction type-specific resource busy signal 238[Ld], as shown. Consequently, OR gate 254 of FIG. 2C generates a true value on hit action signal 124, as shown. The first 16 bytes of the cache line provided by data array 106 on data signals 136 are stored in a temporary register during clock 4.

During clocks 5 through 8, a load finish transaction, denoted "LdFin A1," sequences through the pipeline to obtain the second half, i.e., the second 16 bytes, of the cache line specified by the cache line address 138.

During clock 2, Ld A2 enters the pipeline and proceeds down the pipeline until it reaches the bottom during clock cycle 5, as shown. Therefore, during clock 5, the transaction type signal 108 of FIG. 1 corresponding to the Ld transaction type is true and the other transaction type signals 108 are false. During clock 5, address comparators 104 of FIG. 1 generate a true value on address collision signal 118, as shown. Consequently, OR gate 202 of FIG. 2B generates a true value which causes AND gate 204 of FIG. 2B to generate a true value on retry action [Ld] 208, which in turn causes OR gate 256 of FIG. 2C to generate a true value on retry action signal 126 of FIG. 1, as shown.

Ld A2 is retried and wins arbitration at clock 6. That is, Ld A2 re-arbitrates for the data and tag array 106 and proceeds through the pipeline and arrives at the bottom of the pipeline at clock 9, as shown. Therefore, during clock 9, the transaction type signal 108 of FIG. 1 corresponding to the Ld transaction type is true and the other transaction type signals 108 are false. Because the cache line of address A was invalidated in the cache 100 when it was cached into the other cache by the Ld A1 transaction, tag array 106 generates a false value on hit signal 134 during clock 9, as shown. In the example, no load transaction type resources are busy. Therefore, the load type transaction OR gate 242 of FIG. 2A generates a false value on load transaction type-specific resource busy signal 238[Ld], as shown. Consequently, NOR gate 222 of FIG. 2B generates a true value on its output, and AND gate 224 of FIG. 2B generates a true value on miss action [Ld] 228 of FIG. 2B, which further causes OR gate 252 of FIG. 2C to generate a true value on miss action signal 122 of FIG. 1, as shown.

Figure 5:
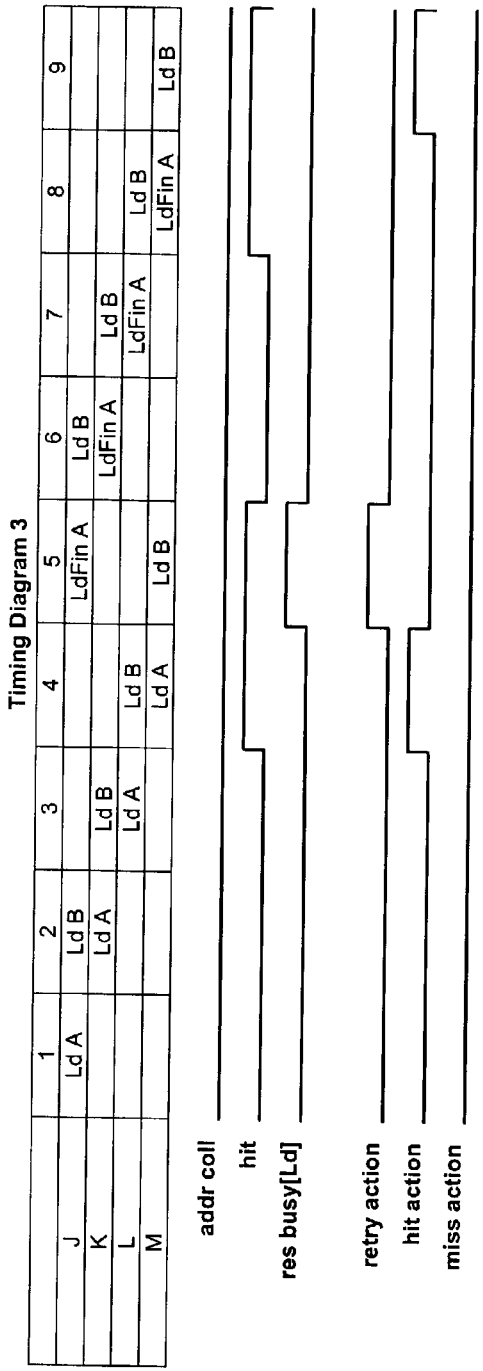

Referring now to FIG. 5, two related art timing diagrams illustrating exemplary operation of the cache 100 of FIG. 1 having the conventional control logic 102 of FIG. 2 according to the flowchart of FIG. 3 are shown. Timing Diagrams 3 and 4 shown in FIG. 5 are similar in many respects to Timing Diagrams 1 and 2 of FIG. 4.

Timing diagram 3 is an example in which a second of two transactions hits in the cache 100, but is retried because a resource needed by the second transaction type is busy; upon being retried, the second transaction hits in the cache 100. The first transaction is a load transaction to an address denoted A, denoted "Ld A," to cache 100 from another cache, such as an L1 data cache. The second transaction is a load transaction from an address denoted B, denoted "Ld B," into another cache, such as an L1 instruction cache.

Ld A enters the pipeline at stage J during clock cycle 1 and proceeds down the pipeline until it reaches the bottom of the pipeline during clock cycle 4, as shown. Therefore, during clock cycle 4, the transaction type signal 108 corresponding to the load transaction type is true and the other transaction type signals 108 are false. In the example, during clock 4, Ld A hits in the data and tag array 106; hence hit signal 134 is true, as shown, causing miss signal 234 to be false. Additionally in the example, none of the resources needed to perform the load type transaction are busy during clock 4; hence the load type transaction OR gate 242 of FIG. 2A generates a false value on load transaction type-specific resource busy signal 238[Ld], as shown. Consequently, OR gate 254 of FIG. 2C generates a true value on hit action signal 124, as shown. The first 16 bytes of the cache line provided by data array 106 on data signals 136 are stored in a temporary register during clock 4. At this point, one or more of the resources 114 of FIG. 1 are needed to complete Ld A and are therefore marked busy.

During clocks 5 through 8, a load finish transaction, denoted "LdFin A," sequences through the pipeline to obtain the second 16 bytes of the cache line specified by the cache line address 138.

During clock 2, Ld B enters the pipeline and proceeds down the pipeline until it reaches the bottom during clock cycle 5, as shown. Therefore, during clock 5, the transaction type signal 108 of FIG. 1 corresponding to the Ld transaction type is true and the other transaction type signals 108 are false. In the example, during clock 5, Ld A caused one or more of the resources needed to perform the load type transaction to become busy; hence the load type transaction OR gate 242 of FIG. 2A generates a true value on load transaction type-specific resource busy signal 238[Ld], as shown. Consequently, OR gate 256 of FIG. 2C generates a true value on retry action signal 126, as shown.

Ld B is retried and wins arbitration at clock 6. That is, Ld B re-arbitrates for the data and tag array 106 and proceeds through the pipeline and arrives at the bottom of the pipeline at clock 9, as shown. Therefore, during clock 9, the transaction type signal 108 of FIG. 1 corresponding to the Ld transaction type is true and the other transaction type signals 108 are false. In the example, address B hits in the data and tag array 106 data and tag array 106 generates a true value on hit signal 134 during clock 9, as shown. In the example, no load transaction type resources are busy during clock 9. Therefore, the load type transaction OR gate 242 of FIG. 2A generates a false value on load transaction type-specific resource busy signal 238[Ld], as shown. Consequently, NOR gate 212 of FIG. 2B generates a true value on its output, and AND gate 214 of FIG. 2B generates a true value on hit action [Ld] 218 of FIG. 2B, which further causes OR gate 254 of FIG. 2C to generate a true value on hit action signal 124 of FIG. 1, as shown.

Timing diagram 4 is an example in which a transaction hits in the cache 100, but is retried because a resource needed by the transaction type is busy; upon being retried, the second transaction misses in the cache 100. In other words, timing diagram 4 is the same as timing diagram 3, except with respect to clock cycles 5 and 9 because in the example in timing diagram 4, Ld B misses in the data and tag array 106. Hence, in timing diagram 4, address B misses in the tag array 106, and tag array 106 generates a false value on hit signal 134 during clock 5, as shown.

Ld B is retried and wins arbitration at clock 6, proceeds through the pipeline and arrives at the bottom of the pipeline at clock 9, as shown. Because address B misses in the tag array 106, tag array 106 generates a false value on hit signal 134 during clock 9, as shown. In the example, no load transaction type resources are busy during clock 9. Therefore, the load type transaction OR gate 242 of FIG. 2A generates a false value on load transaction type-specific resource busy signal 238[Ld], as shown. Consequently, NOR gate 222 of FIG. 2B generates a true value on its output, and AND gate 224 of FIG. 2B generates a true value on miss action [Ld] 228 of FIG. 2B, which further causes OR gate 252 of FIG. 2C to generate a true value on miss action signal 122 of FIG. 1, as shown.

As may be observed from timing diagram 4, although it was known at clock 5 that address B missed in data and tag array 106, the conventional cache action logic of FIG. 2 disadvantageously did not generate a miss action 122 until four clocks later during clock 9. That is, the four clock cycles associated with the retry of Ld B resulted in the miss action 122 being generated four clock cycles later than it could have been. This is because the conventional logic does not distinguish between the set of resources 114 needed to complete a transaction type for a miss and the set of resources 114 needed to complete a transaction type for a hit. Consequently, other functional blocks in the microprocessor that need to know that a miss has occurred, such as bus interface logic that must fetch the missing cache line from system memory, must wait longer than necessary to be notified that a miss has occurred.

However, the present invention solves this problem by recognizing that within the resources needed by each transaction type, the resources needed may be different for misses than for hits for that transaction type. Advantageously, the present invention distinguishes between hit and miss resources for a given transaction type and avoids retrying the transaction if none of the resources needed to complete a miss for the transaction type are busy, but instead immediately signals a miss action, as will now be described.

Figure 6A:
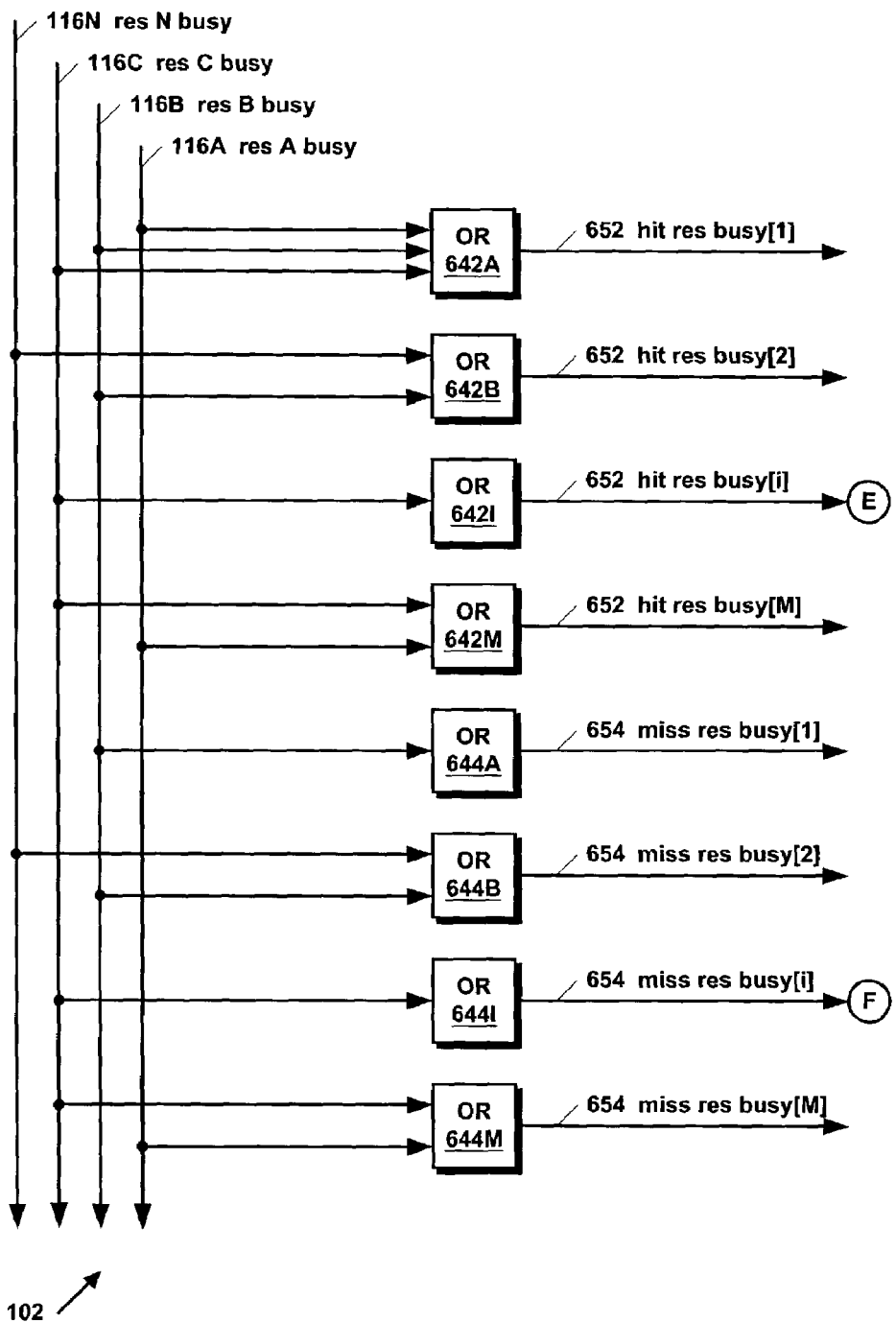
FIGS. 6A and 6B, is a block diagram illustrating logic comprised in the control logic of FIG. 1 according to the present invention, which in combination with the logic of FIG. 2C generates the retry action signal, hit action signal, and miss action signal of FIG. 1.
Figure 6B:
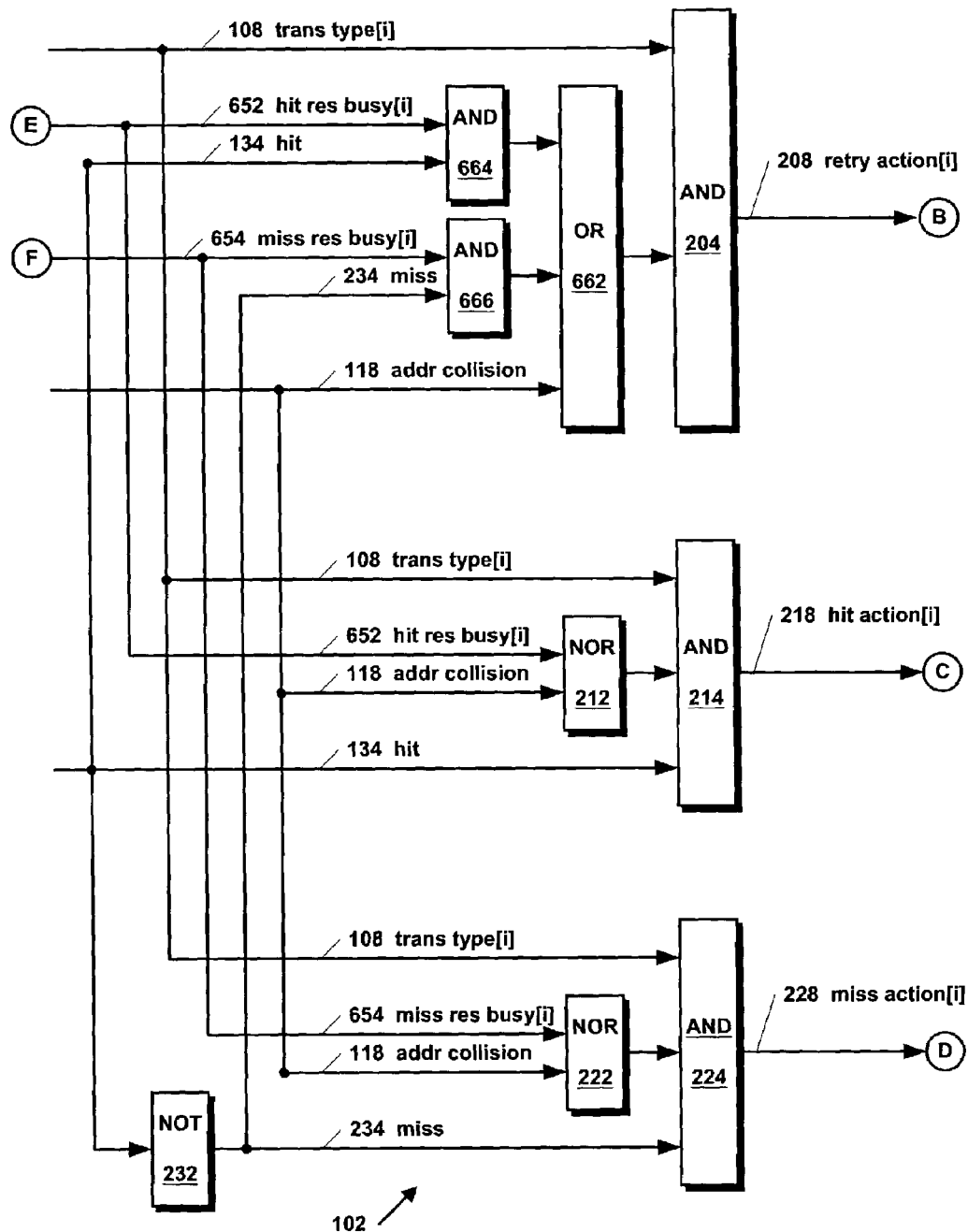

Referring now to FIGS. 6A and 6B, referred to collectively as FIG. 6, a block diagram illustrating logic comprised in control logic 102 of FIG. 1 according to the present invention is shown, which in combination with the logic of FIG. 2C generates retry action signal 126, hit action signal 124, and miss action signal 122 of FIG. 1.

Referring now to FIG. 6A, control logic 102 is similar to control logic 102 of FIG. 2A, except that for each transaction type two resource busy signals are generated—one for a set of hit resources and another for a set of miss resources—rather than one resource busy signal per transaction type as in FIG. 2A.

Control logic 102 of FIG. 6A includes M OR gates 642 corresponding to the M transaction types. OR gates 642 are similar to the OR gates 242 of FIG. 2A, except that OR gates 642 generate transaction type-specific hit resource busy signals 652[1:M]. The OR gates 642 receive various ones of the resource busy signals 116 of FIG. 1 and each generate a corresponding one of the transaction type-specific hit resource busy signals 652[1:M]. A hit resource busy signal 652[i] is true if any of the resource busy signals 116 going into the OR gate 642 is true. The set of resource busy signals 116 going into the various OR gates 642 of FIG. 6A is different, as shown, to illustrate that the set of resources 114 of FIG. 1 for each transaction type on a hit may be different. That is, the number and set of resource busy signals 116 may or may not be different for each transaction type on a hit.

Control logic 102 of FIG. 6A also includes M additional OR gates 644 corresponding to the M transaction types similar to OR gates 642. However, OR gates 644 generate transaction type-specific miss resource busy signals 654[1:M]. The OR gates 644 receive various ones of the resource busy signals 116 of FIG. 1 and each generate a corresponding one of the transaction type-specific miss resource busy signals 654[1:M]. A miss resource busy signal 654[i] is true if any of the resource busy signals 116 going into the OR gate 644 is true. The set of resource busy signals 116 going into the various OR gates 644 of FIG. 6A is different, as shown, to illustrate that the set of resources 114 of FIG. 1 for each transaction type on a miss may be different. That is, the number and set of resource busy signals 116 may or may not be different for each transaction type on a miss.

Referring now to FIG. 6B, control logic 102 is similar to control logic 102 of FIG. 2B, except that control logic 102 of FIG. 6B receives hit resource busy signals 652 and miss resource busy signals 654 of FIG. 6A, rather than generic resource busy signals 238 of FIG. 2A, to generate transaction type-specific retry action 208, hit action 218, and miss action 228 signals.

Control logic 102 includes a collection of combinatorial logic including three AND gates 204, 214, and 224, two NOR gates 212 and 222, and an inverter 232, all similar to like numbered gates of FIG. 2B. In addition, control logic 102 includes two AND gates 664 and 666, and an OR gate 662 similar to OR gate 202 of FIG. 2B, but having three inputs rather than two. Inverter 232 receives hit signal 134 of FIG. 1 and generates a miss signal 234.

AND gate 664 receives transaction type-specific hit resource busy signal 652[i] of FIG. 6A and hit signal 134. AND gate 666 receives transaction type-specific miss resource busy signal 654[i] of FIG. 6A and miss signal 234.

OR gate 662 receives the outputs of AND gates 664 and 666 and address collision signal 118 of FIG. 1. The output of OR gate 662 is provided to AND gate 204. AND gate 204 also receives transaction type signal 108[i] of FIG. 1 and generates a transaction type-specific retry action[i] signal 208.

NOR gate 212 receives transaction type-specific hit resource busy signal 652[i] and address collision signal 118. The output of NOR gate 212 is provided to AND gate 214. AND gate 214 also receives transaction type signal 108[i] and hit signal 134 and generates a transaction type-specific hit action[i] signal 218.

NOR gate 222 receives transaction type-specific miss resource busy signal 654[i] and address collision signal 118. The output of NOR gate 222 is provided to AND gate 224. AND gate 224 also receives transaction type signal 108[i] and miss signal 234 and generates a transaction type-specific miss action[i] signal 228.

Control logic 102 of FIG. 6 also includes combinatorial logic similar to the control logic 102 of FIG. 2C for receiving retry action 208, hit action 218, and miss action 228 signals of FIG. 6B and generating retry action 126, hit action 124, and miss action 122 signals of FIG. 1.

Figure 7:
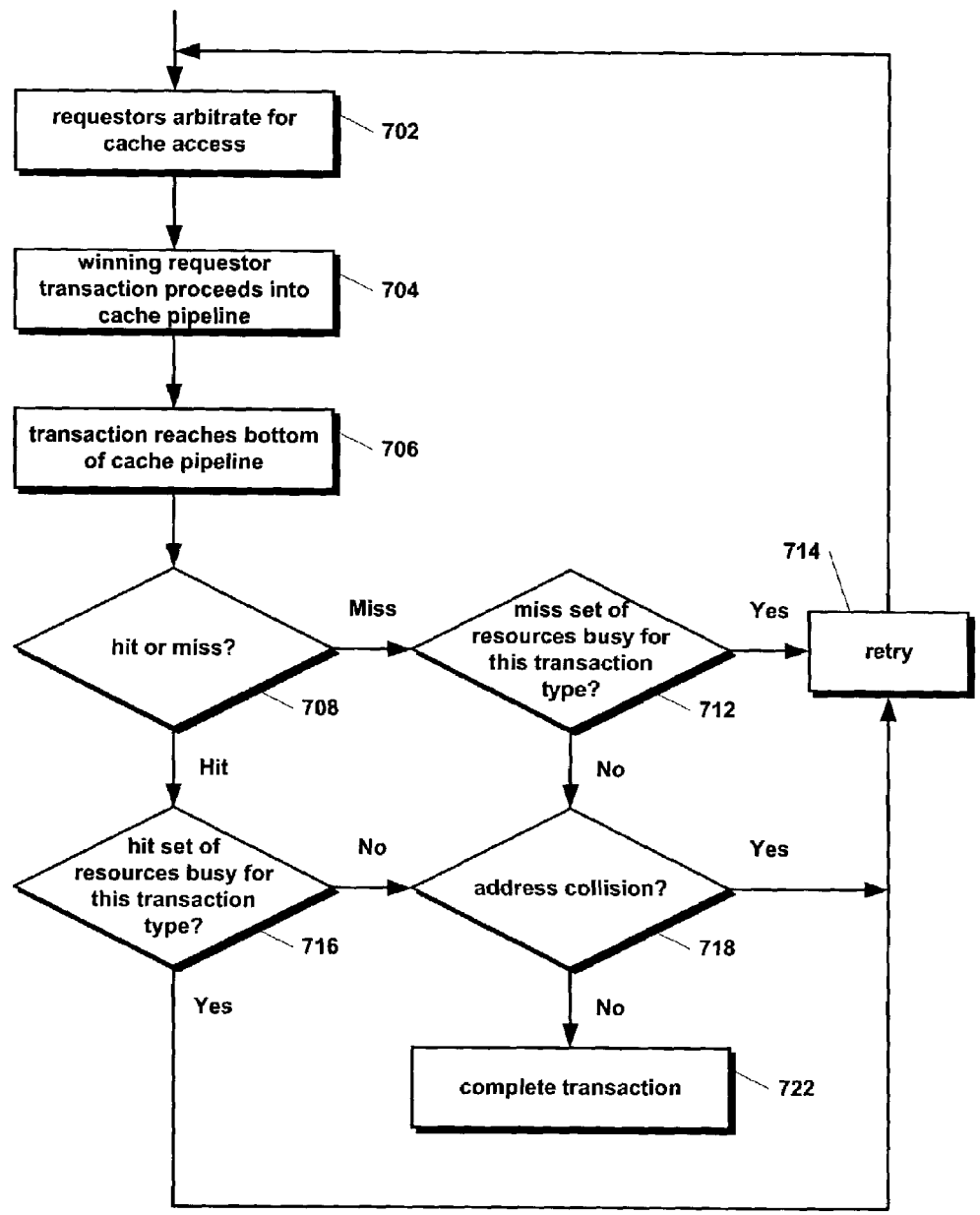
FIG. 7 is a flowchart illustrating operation of the cache of FIG. 1 having the control logic of FIG. 6 according to the present invention.

Referring now to FIG. 7, a flowchart illustrating operation of the cache 100 of FIG. 1 having the control logic 102 of FIG. 6 according to the present invention is shown. Flow begins at block 702.

At block 702, control logic 102 of FIG. 1 arbitrates between the requestors 112 of FIG. 1 for access to data and tag array 106. Flow proceeds to block 704.

At block 704, the transaction associated with the requester 112 winning arbitration proceeds into and sequences through the cache 100 pipeline. Flow proceeds to block 706.

At block 706, the transaction reaches the bottom of the cache 100 pipeline. Flow proceeds to decision block 708.

At decision block 708, control logic 102 of FIG. 6 examines hit signal 134 of FIG. 1 to determine whether cache line address 138 hits or misses in cache 100. If hit signal 134 is false, i.e., indicates a miss, then flow proceeds to decision block 712. Otherwise, a hit occurred and flow proceeds to decision block 716.

At decision block 712, control logic 102 examines the resource busy signals 116 of FIG. 1 to determine whether any of the resources 114 needed to perform the type of transaction specified by the true transaction type signals 108 when the transaction misses in cache 100 are busy. If so, flow proceeds to block 714. Otherwise, flow proceeds to decision block 718.

At block 714, control logic 102 of FIG. 6 generates a true value on retry action signal 126 of FIG. 1 to indicate that the transaction must be retried because one or more of the resources 114 needed to complete the transaction with the specified hit or miss trait are busy or there was an address collision, as determined at block 708, 712, 716, and 718. Flow proceeds back to block 702 so that the transaction can re-arbitrate for access to data and tag array 106.

At decision block 716, control logic 102 of FIG. 6 examines the resource busy signals 116 of FIG. 1 to determine whether any of the resources 114 needed to perform the type of transaction specified by the true transaction type signals 108 when the transaction hits in cache 100 are busy. If so, flow proceeds to block 714. Otherwise, flow proceeds to decision block 718.

At decision block 718, control logic 102 of FIG. 6 examines address collision signals 118 to determine whether an address collision has occurred that would prevent the transaction from completing. If so, flow proceeds to block 714 so that the transaction is retried. Otherwise, flow proceeds to block 722.

At block 722, the cache 100 completes the transaction. Flow ends at block 722.

Figure 8:
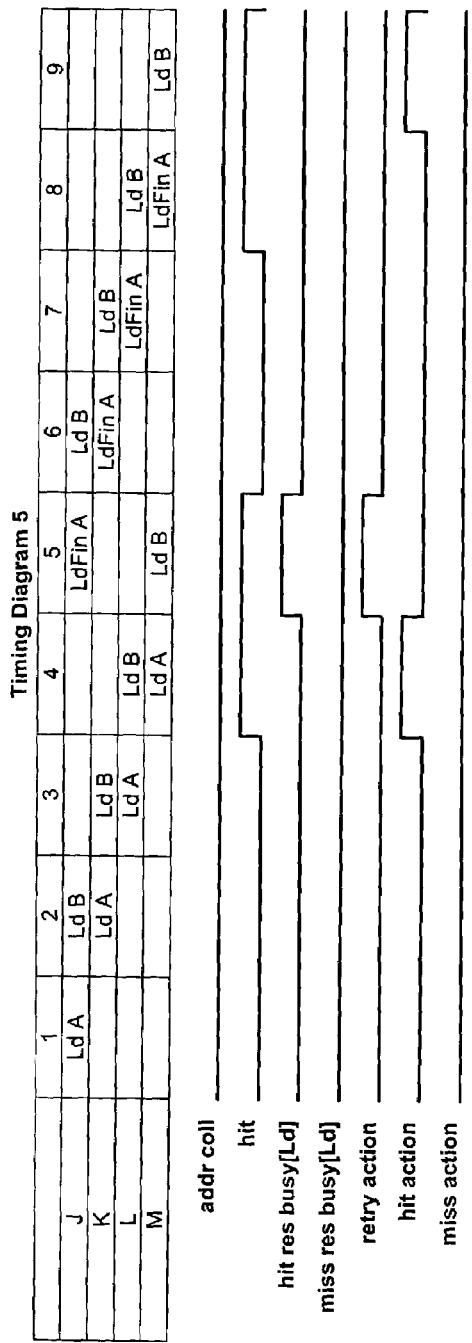
FIG. 8 is two timing diagrams illustrating exemplary operation of the cache of FIG. 1 having the control logic of FIG. 6 according to the flowchart of FIG. 7 according to the present invention.
Figure 8:
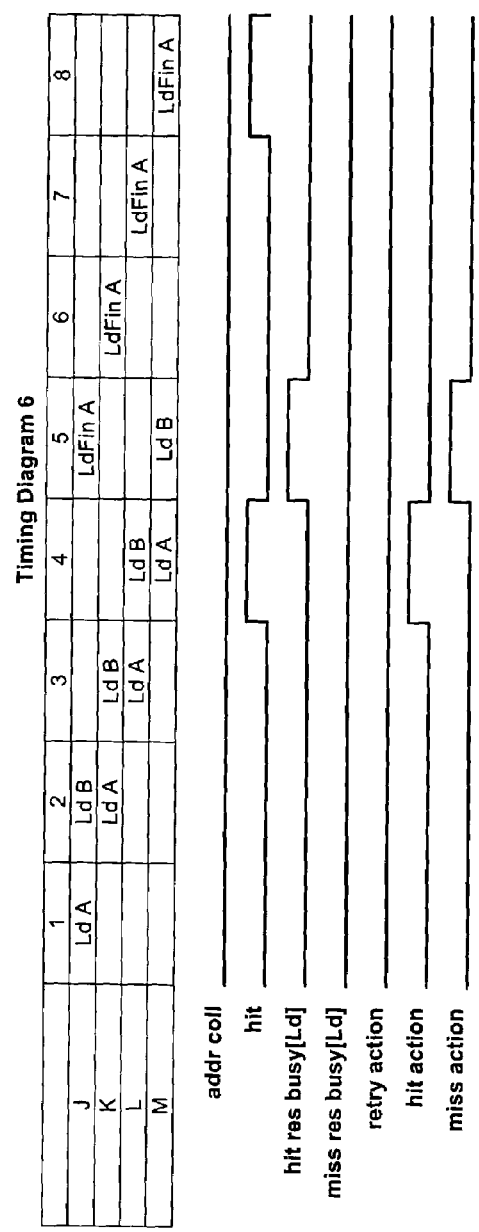

Referring now to FIG. 8, two timing diagrams illustrating exemplary operation of the cache 100 of FIG. 1 having control logic 102 of FIG. 6 according to the flowchart of FIG. 7 according to the present invention are shown.

The example in timing diagram 5 is similar to the example in timing diagram 3 of FIG. 5 in that a Ld A transaction is followed by a Ld B transaction, both of which hit in the cache 100. However, the example shown in timing diagram 5 is applied to control logic 102 of FIG. 6, which distinguishes between the set of resources 114 needed by a particular transaction type on a miss and the set of resources 114 needed by the transaction type on a hit. In particular, timing diagram 5 illustrates how control logic 102 of FIG. 6 distinguishes between the set of resources 114 needed by a load transaction type on a miss and the set of resources 114 needed by a load transaction type on a hit.

Referring now to timing diagram 5, Ld A enters the pipeline at stage J during clock cycle 1 and proceeds down the pipeline until it reaches the bottom of the pipeline during clock cycle 4, as shown. Therefore, during clock cycle 4, the transaction type signal 108 corresponding to the load transaction type is true and the other transaction type signals 108 are false. In the example, during clock 4, Ld A hits in the data and tag array 106; hence hit signal 134 is true, as shown, causing miss signal 234 to be false.

Additionally in the example, none of the resources 114 needed to perform the load type transaction on a hit are busy during clock 4, and none of the resources 114 needed to perform the load type transaction on a miss are busy during any clock cycles; hence the load type transaction OR gate 642 of FIG. 6A generates a false value on load transaction type-specific hit resource busy signal 652[Ld], and the load type transaction OR gate 644 of FIG. 6A generates a false value on load transaction type-specific miss resource busy signal 654[Ld], as shown. In the example, address collision signals 118 are also false during all clocks. Consequently, NOR gate 212 of FIG. 6B generates a true value on its output, and AND gate 214 of FIG. 6B generates a true value on hit action [Ld] 218 of FIG. 6B, which further causes OR gate 254 of FIG. 2C to generate a true value on hit action signal 124 of FIG. 1, as shown. The first 16 bytes of the cache line provided by data array 106 on data signals 136 are stored in a temporary register during clock 4. At this point, one or more of the resources 114 of FIG. 1 are needed to complete the Ld A with a hit trait and are therefore marked busy.

During clocks 5 through 8, a load finish transaction, denoted "LdFin A," sequences through the pipeline to obtain the second 16 bytes of the cache line specified by the cache line address 138.

During clock 2, Ld B enters the pipeline and proceeds down the pipeline until it reaches the bottom during clock cycle 5, as shown. Therefore, during clock 5, the transaction type signal 108 of FIG. 1 corresponding to the Ld transaction type is true and the other transaction type signals 108 are false. In the example, during clock 5, Ld B hits in the tag array 106; hence hit signal 134 is true, as shown, causing miss signal 234 to be false. In the example, during clock 5, Ld A caused one or more of the resources 114 needed to perform the load type transaction on a hit to become busy; hence the load type transaction OR gate 642 of FIG. 6A generates a true value on load transaction type-specific hit resource busy signal 652[Ld], as shown. Consequently, AND gate 664 of FIG. 6B generates a true value on its output. Consequently, OR gate 662 of FIG. 6B generates a true value on its output. Consequently, AND gate 204 of FIG. 6B generates a true value on load transaction type-specific retry action signal 208[Ld]. Consequently, OR gate 256 of FIG. 2C generates a true value on retry action signal 126, as shown.

Ld B is retried and wins arbitration at clock 6. That is, Ld B re-arbitrates for the data and tag array 106 and proceeds through the pipeline and arrives at the bottom of the pipeline at clock 9, as shown. Therefore, during clock 9, the transaction type signal 108 of FIG. 1 corresponding to the Ld transaction type is true and the other transaction type signals 108 are false. In the example, address B hits in the tag array 106 and tag array 106 generates a true value on hit signal 134 during clock 9, as shown. In the example, no load transaction type resources 114 are busy during clock 9, neither for a hit nor for a miss. Therefore, the load type transaction OR gate 642 of FIG. 6A generates a false value on load transaction type-specific hit resource busy signal 652[Ld] and the load type transaction OR gate 644 of FIG. 6A generates a false value on load transaction type-specific miss resource busy signal 654[Ld], as shown. Consequently, NOR gate 212 of FIG. 6B generates a true value on its output, and AND gate 214 of FIG. 6B generates a true value on hit action [Ld] 218 of FIG. 6B, which further causes OR gate 254 of FIG. 2C to generate a true value on hit action signal 124 of FIG. 1, as shown.

It is noted that in the example of timing diagram 5 the set of resources 114 needed to complete a load type transaction when the hit for Ld B occurs at clock 5 are busy and therefore Ld B must be retried as in timing diagram 3. Consequently, the hit action 124 for Ld B is not generated any earlier than in timing diagram 3.

The example in timing diagram 6 of FIG. 8 is similar to the example in timing diagram 4 of FIG. 5 in that a Ld A transaction is followed by a Ld B transaction, Ld A hits in the cache 100, and Ld B misses in the cache 100. However, the example shown in timing diagram 6 is applied to control logic 102 of FIG. 6, which distinguishes between the set of resources 114 needed by a load transaction type on a miss and the set of resources 114 needed by a load transaction type on a hit. Hence, in timing diagram 6 the miss action 228 is advantageously generated for transaction Ld B during clock cycle 5, rather than in clock 9 as in timing diagram 4 of FIG. 5 by the conventional control logic 102 of FIG. 2.

Referring now to timing diagram 6, Ld A enters the pipeline at stage J during clock cycle 1 and proceeds down the pipeline until it reaches the bottom of the pipeline during clock cycle 4, as shown. Therefore, during clock cycle 4, the transaction type signal 108 corresponding to the load transaction type is true and the other transaction type signals 108 are false. In the example, during clock 4, Ld A hits in the tag array 106; hence hit signal 134 is true, as shown, causing miss signal 234 to be false.

Additionally in the example, none of the resources 114 needed to perform the load type transaction on a hit are busy during clock 4; hence the load type transaction OR gate 642 of FIG. 6A generates a false value on load transaction type-specific hit resource busy signal 652[Ld], as shown. In the example, the resources 114 needed to perform a load type transaction on a miss are not busy during any clock cycles; hence the load type transaction OR gate 644 of FIG. 6A generates a false value on load transaction type-specific miss resource busy signal 654[Ld] during all clocks, as shown. During clock 4, because miss signal 234 is false, AND gate 224 of FIG. 6B generates a false value on miss action [Ld] signal 228 of FIG. 6B, as shown. In the example, address collision signal 118 is also false during all clocks.

Consequently, NOR gate 212 of FIG. 6B generates a true value on its output, and AND gate 214 of FIG. 6B generates a true value on hit action [Ld] 218 of FIG. 6B, which further causes OR gate 254 of FIG. 2C to generate a true value on hit action signal 124 of FIG. 1, as shown. The first 16 bytes of the cache line provided by data array 106 on data signals 136 are stored in a temporary register during clock 4. At this point, one or more of the resources 114 of FIG. 1 are needed to complete the Ld A with a hit trait and are therefore marked busy.

During clocks 5 through 8, a load finish transaction, denoted "LdFin A," sequences through the pipeline to obtain the second 16 bytes of the cache line specified by the cache line address 138.

During clock 2, Ld B enters the pipeline and proceeds down the pipeline until it reaches the bottom during clock cycle 5, as shown. Therefore, during clock 5, the transaction type signal 108 of FIG. 1 corresponding to the Ld transaction type is true and the other transaction type signals 108 are false. In the example, during clock 5, Ld B misses in the tag array 106; hence hit signal 134 is false, as shown, causing miss signal 234 to be true. In the example, as stated above, the miss set of resources 114 for a load type transaction are not busy during any clocks; hence the load type transaction OR gate 644 of FIG. 6A generates a false value on load transaction type-specific miss resource busy signal 654[Ld] during all clocks, as shown. Consequently, during clock 5 NOR gate 222 of FIG. 6B generates a true value on its output. Consequently, AND gate 224 of FIG. 6B generates a true value on load transaction type-specific miss action signal 228 [Ld]. Consequently, OR gate 252 of FIG. 2C generates a true value on miss action signal 122 during clock 5, as shown.

As may be observed by comparing timing diagram 6 with timing diagram 4, the cache 100 having control logic 102 of FIG. 6 according to the present invention does not retry the Ld B transaction once it is determined during clock 5 that Ld B misses in the cache 100 and that none of the resources needed to complete a load miss are busy. Consequently, the present invention advantageously generates a miss action 122 potentially 4 clock cycles—i.e., the depth of the cache 100 pipeline—sooner than the conventional solution.

Figure 9A:
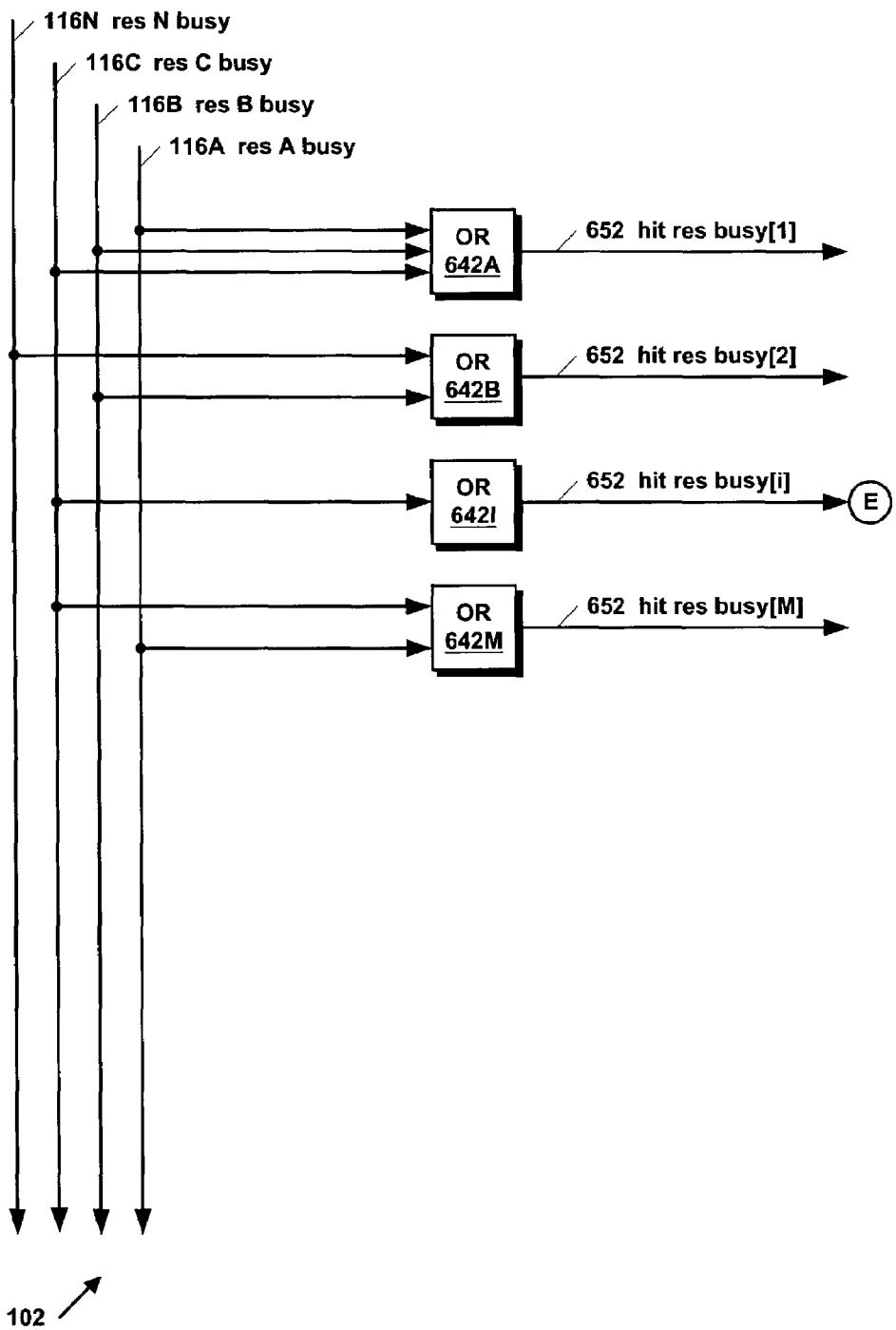
FIGS. 9A and 9B, is a block diagram illustrating logic comprised in the control logic of FIG. 1 according to an alternate embodiment of the present invention, which in combination with the logic of FIG. 2C generates the retry action signal, hit action signal, and miss action signal of FIG. 1.
Figure 9B:
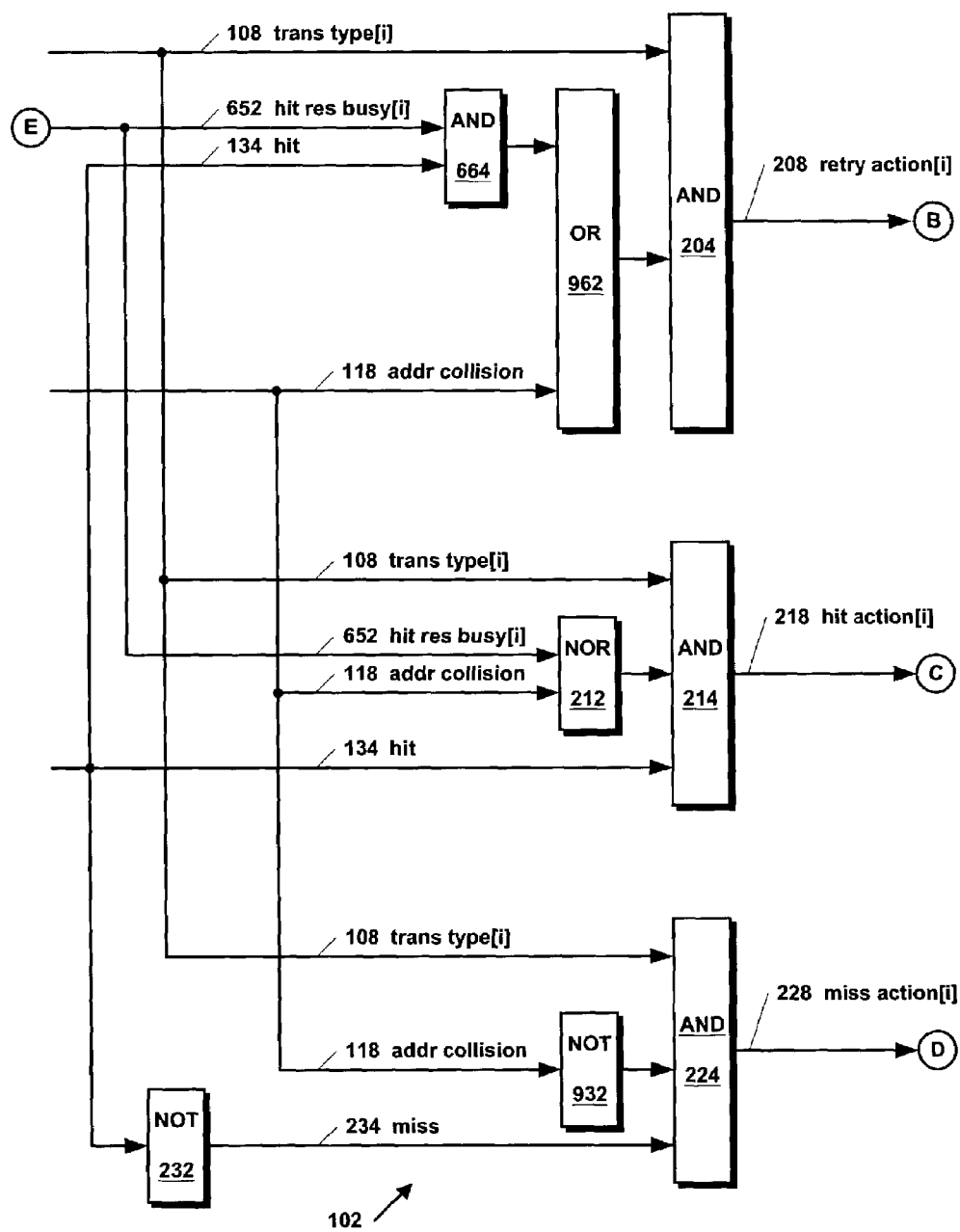

Referring now to FIGS. 9A and 9B, referred to collectively as FIG. 9, a block diagram illustrating logic comprised in control logic 102 of FIG. 1 according to an alternate embodiment of the present invention is shown, which in combination with the logic of FIG. 2C generates retry action signal 126, hit action signal 124, and miss action signal 122 of FIG. 1.

Referring now to FIG. 9A, control logic 102 is similar to control logic 102 of FIG. 6A, except that for each transaction type no miss resource busy signals are generated. This is because in the embodiment of FIG. 9, the set of resources 114 required to complete a transaction on a miss is a null set for one or more of the transaction types.

Referring now to FIG. 9B, control logic 102 is similar to control logic 102 of FIG. 6B, except that control logic 102 of FIG. 9B receives no miss resource busy signals to generate transaction type-specific retry action 208, hit action 218, and miss action 228 signals.

Control logic 102 of FIG. 9B includes a collection of combinatorial logic including four AND gates 204, 214, 224, and 664, one NOR gate 212, and an inverter 232, all similar to like numbered gates of FIG. 6B. In addition, control logic 102 includes one OR gate 962 similar to OR gate 662 of FIG. 2B, but having two inputs rather than three, and a second inverter 932. Inverter 232 receives hit signal 134 of FIG. 1 and generates a miss signal 234. Inverter 932 receives address collision signal 118 and provides the inverted signal as an input to AND gate 224.

AND gate 664 receives transaction type-specific hit resource busy signal 652[i] of FIG. 9A and hit signal 134. OR gate 962 receives the outputs of AND gate 664 and address collision signal 118 of FIG. 1. The output of OR gate 962 is provided to AND gate 204. AND gate 204 also receives transaction type signal 108[i] of FIG. 1 and generates a transaction type-specific retry action[i] signal 208.

NOR gate 212 receives transaction type-specific hit resource busy signal 652[i] and address collision signal 118. The output of NOR gate 212 is provided to AND gate 214. AND gate 214 also receives transaction type signal 108[i] and hit signal 134 and generates a transaction type-specific hit action[i] signal 218.

AND gate 224 receives transaction type signal 108[i], the output of inverter 932, and miss signal 234 and generates a transaction type-specific miss action[i] signal 228.

Control logic 102 of FIG. 9 also includes combinatorial logic similar to the control logic 102 of FIG. 2C for receiving retry action 208, hit action 218, and miss action 228 signals of FIG. 9B and generating retry action 126, hit action 124, and miss action 122 signals of FIG. 1.

Figure 10:
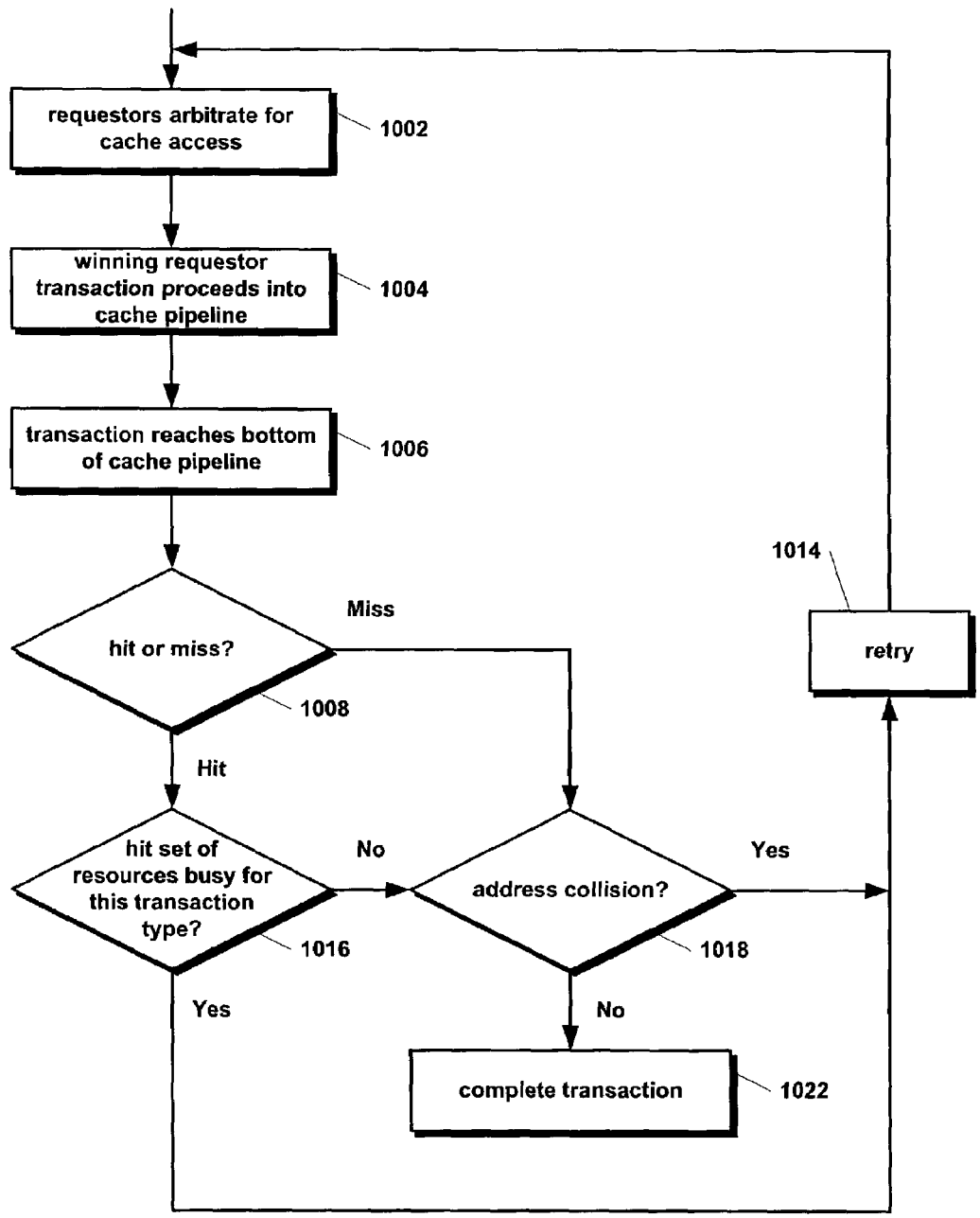
FIG. 10 is a flowchart illustrating operation of the cache of FIG. 1 having the control logic of FIG. 9 according to an alternate embodiment the present invention.

Referring now to FIG. 10, a flowchart illustrating operation of the cache 100 of FIG. 1 having the control logic 102 of FIG. 9 according to an alternate embodiment the present invention is shown. Flow begins at block 1002.

At block 1002, control logic 102 of FIG. 1 arbitrates between the requesters 112 of FIG. 1 for access to data and tag array 106. Flow proceeds to block 1004.

At block 1004, the transaction associated with the requester 112 winning arbitration proceeds into and sequences through the cache 100 pipeline. Flow proceeds to block 1006.

At block 1006, the transaction reaches the bottom of the cache 100 pipeline. Flow proceeds to decision block 1008.

At decision block 1008, control logic 102 of FIG. 9 examines hit signal 134 of FIG. 1 to determine whether cache line address 138 hits or misses in cache 100. If hit signal 134 is false, i.e., indicates a miss, then flow proceeds to decision block 1018. Otherwise, a hit occurred and flow proceeds to decision block 1016.

At decision block 1016, control logic 102 of FIG. 9 examines the resource busy signals 116 of FIG. 1 to determine whether any of the resources 114 needed to perform the type of transaction specified by the true transaction type signals 108 when the transaction hits in cache 100 are busy. If so, flow proceeds to block 1014. Otherwise, flow proceeds to decision block 1018.

At block 1014, control logic 102 of FIG. 9 generates a true value on retry action signal 126 of FIG. 1 to indicate that the transaction must be retried because one or more of the resources 114 needed to complete the transaction with the specified hit trait are busy or there was an address collision, as determined at block 1008, 1016, and 1018. Flow proceeds back to block 1002 so that the transaction can re-arbitrate for access to data and tag array 106.

At decision block 1018, control logic 102 of FIG. 9 examines address collision signals 118 to determine whether an address collision has occurred that would prevent the transaction from completing. If so, flow proceeds to block 1014 so that the transaction is retried. Otherwise, flow proceeds to block 1022.

At block 1022, the cache 100 completes the transaction. Flow ends at block 1022.

Referring now to FIG. 11, a timing diagram illustrating exemplary operation of the cache 100 of FIG. 1 having control logic 102 of FIG. 9 according to the flowchart of FIG. 10 according to an alternate embodiment of the present invention is shown.

The example in timing diagram 7 is similar to the example in timing diagram 6 of FIG. 8 in that a Ld A transaction is followed by a Ld B transaction. However, both Ld A and Ld B miss in the cache 100. Furthermore, the example shown in timing diagram 7 is applied to control logic 102 of FIG. 9, in which the set of resources 114 needed by a load transaction on a miss is a null set.

Referring now to timing diagram 11, Ld A enters the pipeline at stage J during clock cycle 1 and proceeds down the pipeline until it reaches the bottom of the pipeline during clock cycle 4, as shown. Therefore, during clock cycle 4, the transaction type signal 108 corresponding to the load transaction type is true and the other transaction type signals 108 are false. In the example, during clock 4, Ld A misses in the tag array 106; hence hit signal 134 is false, as shown, causing miss signal 234 to be true.

Additionally in the example, none of the resources 114 needed to perform the load type transaction on a hit are busy during any of the clock cycles; hence the load type transaction OR gate 642 of FIG. 9A generates a false value on load transaction type-specific hit resource busy signal 652 [Ld] during all clock cycles, as shown. In the example, address collision signal 118 is also false during all clocks. Consequently, during clock 4 AND gate 224 of FIG. 9B generates a true value on miss action [Ld] 228 of FIG. 9B, which further causes OR gate 252 of FIG. 2C to generate a true value on miss action signal 122 of FIG. 1, as shown.

During clock 2, Ld B enters the pipeline and proceeds down the pipeline until it reaches the bottom during clock cycle 5, as shown. Therefore, during clock 5, the transaction type signal 108 of FIG. 1 corresponding to the Ld transaction type is true and the other transaction type signals 108 are false. In the example, during clock 5, Ld B misses in the tag array 106; hence hit signal 134 is false, as shown, causing miss signal 234 to be true. Consequently, during clock 5 AND gate 224 of FIG. 9B generates a true value on load transaction type-specific miss action signal 228[Ld], which further causes OR gate 252 to generate a true value on miss action signal 122 during clock 5, as shown.

As may be observed from timing diagram 7, the present invention advantageously does not generate a retry action 126 for the Ld B transaction which missed, even though Ld A ahead of it also missed. Consequently, even on back-to-back misses the present invention may generate miss actions 122 four clock cycles earlier than the conventional approach.

Although the present invention and its objects, features, and advantages have been described in detail, other embodiments are encompassed by the invention. For example, caches at any level in the microprocessor cache hierarchy may employ the present invention. Also, the invention is adaptable to internal or external caches and to caches of any size or pipeline depth.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

I claim:

1. A cache memory, comprising:
    a first set of resources, needed to complete first load transaction when a first cache line address of said first load transaction hits in the cache;
    a second set of resources, needed to complete a second load transaction when a second cache line address of said second load transaction misses in the cache while said first set of resources is busy completing said first load transaction, said second set being different than said first set; and
    control logic, coupled to said first and second set of resources, configured to immediately assert a miss indicator to indicate said second cache line address missed in said cache if none of said second set of resources is busy, rather than retrying said second transaction, even though said first set of resources is still busy completing said first load transaction.

2. The cache memory of claim 1, wherein said control logic asserts a retry indicator in response to said second transaction if one or more of said second set of resources is busy.

3. The cache memory of claim 2, wherein said retrying said second transaction comprises re-arbitrating with other transactions for access to the cache memory.

4. The cache memory of claim 3, wherein the cache memory comprises a pipeline.

5. The cache memory of claim 4, wherein said retrying said second transaction comprises re-sequencing said second transaction through said pipeline.

6. The cache memory of claim 4, wherein said control logic asserts said retry indicator if said second address matches an address of another transaction in said cache pipeline.

7. The cache memory of claim 4, wherein said first load transaction makes two passes through said cache memory pipeline.

8. The cache memory of claim 1, wherein if said first address hits in the cache, and if none of said first set of resources is busy, then said control logic asserts a hit indicator in response to said first transaction rather than retrying said first transaction, regardless of whether any of said second set of resources is busy.

9. The cache memory of claim 1, wherein said first set of resources comprises a register for storing a first portion of a cache line specified by said first cache line address.

10. The cache memory of claim 1, further comprising:
    a transaction type input, coupled to said control logic, for specifying which of a plurality of types of transactions performable by the cache said first and second transaction are.

11. The cache memory of claim 10, wherein said first and second set of resources is different depending upon which of said plurality of transaction types said first and second transaction are.

12. The cache memory of claim 1, wherein said first and second transactions comprises snoop transactions.

13. The cache memory of claim 1, wherein said first and second transactions comprises castout transactions.

14. The cache memory of claim 1, wherein said first and second transactions comprises store transactions.

15. The cache memory of claim 1, wherein the cache is a victim cache.

16. The cache memory of claim 1, wherein the cache is a level-two cache.

17. A cache memory, comprising:
- a plurality of type signals, for specifying which of a plurality of transaction types each of a plurality of transactions is, each of said plurality of transactions specifying a cache line;
- a hit signal, for indicating whether said cache line is present in the cache and whether said cache line is not present in the cache;
- a plurality of busy signals, for specifying whether a corresponding plurality of resources are busy, wherein a predetermined subset of said plurality of resources is needed for completing each of said plurality of transaction types, wherein said predetermined subsets are based on said hit signal and said plurality of transaction type signals;
- control logic, coupled to receive said plurality of type signals, said hit signal, and said plurality of busy signals, configured to:
  - (1) detect that said plurality of type signals indicate a first of said plurality of transactions is of a first of said plurality of transaction types;
  - (2) detect that said plurality of type signals indicate a second of said plurality of transactions is of a second of said plurality of transaction types, wherein said second transaction immediately follows said first transaction in the cache;
  - (3) detect that said hit signal indicates a cache line specified by said second transaction is not present in the cache;
  - (4) detect that said plurality of busy signals indicate at least one of a first of said predetermined subsets of said plurality of resources needed to complete said first of said plurality of transaction types is busy;
  - (5) detect that said plurality of busy signals indicate none of a second of said predetermined subsets of said plurality of resources needed to complete said second of said plurality of transaction types is busy;
  - (6) immediately generate a miss action signal, in response to said second transaction and said conditions (1) through (5).

18. The cache memory of claim 17, wherein said first of said plurality of transaction types comprises a load transaction type, wherein said first predetermined subset of said plurality of resources needed to complete said first of said plurality of transaction types comprises a register for storing a first portion of said cache line specified by said first transaction.

19. The cache memory of claim 18, wherein said wherein said second of said plurality of transaction types comprises said load transaction type.

20. The cache memory of claim 17, wherein said first transaction makes two passes through said cache memory.

21. The cache memory of claim 17, wherein said first and second of said plurality of transaction types comprise store transaction types.

22. The cache memory of claim 17, wherein said control logic generates a true value on a retry action signal, in response to said second transaction, if instead said control logic detects that said plurality of busy signals indicate at least one of said second of said predetermined subsets of said plurality of resources needed to complete said second of said plurality of transaction types is busy.

23. The cache memory of claim 17, wherein said first and second of said plurality of transaction types comprise snoop transaction types.

24. The cache memory of claim 17, wherein said cache memory comprises a victim cache.

25. A method for generating cache action signals of a cache memory, comprising:
- determining that a first cache line address of a first transaction is present in the cache memory;
- determining that a second cache line address of a second transaction immediately following said first transaction in the cache is not present in the cache memory, after said determining that said first cache line address is present in the cache memory;
- determining whether any of a first set of resources is busy completing said first transaction;
- determining whether any of a second set of resources needed to complete said second transaction is busy, wherein said first and second set of resources are different; and
- generating a miss action signal in response to said second transaction if none of said second set of resources is busy even if some of said first set of resources is busy completing said first transaction.

26. The method of claim 25, further comprising:
- generating a retry action signal in response to said second transaction if any of said second set of resources is busy.

27. The method of claim 26, further comprising:
- generating a retry action signal in response to said first transaction if any of said first set of resources is busy.

28. The method of claim 27, further comprising:
- generating a hit action signal in response to said first transaction if none of said first set of resources even if some of said second set of resources is busy.

29. The method of claim 25, wherein the cache memory is a pipelined cache memory comprising a plurality of stages.

30. The method of claim 29, further comprising:
- comparing said first cache line address with other cache line addresses in said plurality of stages.

31. The method of claim 30, further comprising:
- generating said retry action signal in response to said first transaction if said first cache line address matches one or more of said other cache line addresses in said plurality of stages.

32. The method of claim 25, further comprising:
- determining a transaction type of said second transaction, prior to said generating said miss action signal.

33. The method of claim 25, wherein said cache memory comprises a victim cache.

34. The method of claim 25, wherein said first transaction comprises a load transaction, wherein said first set of resources comprises a register for storing a first portion of a cache line specified by said load transaction.

35. The method of claim 25, wherein said first load transaction makes two passes through said cache memory pipeline.

* * * * *

UNITED STATES PATENT AND TRADEMARK OFFICE
CERTIFICATE OF CORRECTION

| | | |
|---|---|---|
| PATENT NO. | : 7,085,885 B2 | Page 1 of 1 |
| APPLICATION NO. | : 10/266019 | |
| DATED | : August 1, 2006 | |
| INVENTOR(S) | : James N. Hardage | |

It is certified that error appears in the above-identified patent and that said Letters Patent is hereby corrected as shown below:

Title Page #74
Page 1, Attorney, Agent, or Firm entry should read:

E. Alan Davis
James W. Huffman

Title Page #73
Page 1, Assignee Name and Residence should read:

IP-First, LLC.        Fremont, CA

Signed and Sealed this

Twelfth Day of December, 2006

JON W. DUDAS
*Director of the United States Patent and Trademark Office*